United States Patent
Tso et al.

(10) Patent No.: US 9,981,268 B2
(45) Date of Patent: May 29, 2018

(54) SAFETY SHREDDER WITH MECHANICAL BIN-FULL DEVICE

(71) Applicants: Yung Kang Tso, Shanghai (CN); Xiuming Liu, Shanghai (CN)

(72) Inventors: Yung Kang Tso, Shanghai (CN); Xiuming Liu, Shanghai (CN)

(73) Assignee: AURORA OFFICE EQUIPMENT CO., LTD. SHANGHAI, Shanghai (CN)

( * ) Notice: Subject to any disclaimer, the term of this patent is extended or adjusted under 35 U.S.C. 154(b) by 575 days.

(21) Appl. No.: 14/553,899

(22) Filed: Nov. 25, 2014

(65) Prior Publication Data
US 2015/0076260 A1  Mar. 19, 2015

Related U.S. Application Data

(63) Continuation-in-part of application No. 13/850,993, filed on Mar. 26, 2013, now abandoned.

(30) Foreign Application Priority Data

Jan. 15, 2013  (CN) .......................... 2013 1 0014035
Jan. 15, 2013  (CN) .......................... 2013 1 0014059
Jan. 15, 2013  (CN) .......................... 2013 1 0014063

(51) Int. Cl.
*B02C 18/00* (2006.01)
*G01F 23/24* (2006.01)
(Continued)

(52) U.S. Cl.
CPC ...... *B02C 18/0007* (2013.01); *B02C 18/2216* (2013.01); *B02C 23/04* (2013.01);
(Continued)

(58) Field of Classification Search
CPC ........ B02C 18/0007; B02C 2018/0015; B02C 2018/0023; B02C 23/04; B02C 25/00; F16P 3/08
(Continued)

(56) References Cited

U.S. PATENT DOCUMENTS 4,650,128 A * 3/1987 Goldhammer ...... B02C 18/0007
                                                    241/100
6,978,954 B2   12/2005 Kroger et al.
(Continued)

FOREIGN PATENT DOCUMENTS

CN  101639375 A   2/2010
CN  101437620 B   1/2013
(Continued)

*Primary Examiner* — Faye Francis
(74) *Attorney, Agent, or Firm* — WHGC, P.L.C.; John F. O'Rourke

(57) ABSTRACT

A mechanical bin-full device for a paper shredder with a bin, having a curved, perforated T-blade sensor on a cylindrical body partially covered with a metal sheet. The T-blade is pendent into the bin. Metal contacts are placed on the paper shredder near the metal sheet, forming a switch, which is coupled to a motor control circuit for the shredder motor. The T-blade is pushed by paper shreddant and rotates the cylinder body as paper shreddant fills the bin. When the bin becomes full, the T-blade is positioned so that the metal contacts touch the metal sheet, closing the control circuit switch, and causing the motor to cease operating. The control circuit can include a microcontroller coupled to the motor, or a transistor-based driver coupled to a motor relay.

6 Claims, 21 Drawing Sheets

(51) Int. Cl.
*H02P 29/00* (2016.01)
*B02C 23/04* (2006.01)
*B02C 18/22* (2006.01)
*B02C 18/16* (2006.01)

(52) U.S. Cl.
CPC .............. *G01F 23/24* (2013.01); *H02P 29/00* (2013.01); *B02C 2018/164* (2013.01)

(58) Field of Classification Search
USPC .................................. 241/37.5, 100, 236, 36
See application file for complete search history.

(56) References Cited

U.S. PATENT DOCUMENTS

| | | | |
|---|---|---|---|
| 7,204,441 B1 * | 4/2007 | Hartnett | B02C 18/0007 241/100 |
| 7,213,777 B2 | 5/2007 | Podrovitz | |
| 7,823,815 B2 | 11/2010 | Jensen | |
| 7,823,816 B2 | 11/2010 | Jensen | |
| 7,942,352 B2 | 5/2011 | Matlin et al. | |
| 8,028,942 B2 | 10/2011 | Matlin et al. | |
| 8,167,223 B2 | 5/2012 | Jensen et al. | |
| 8,336,792 B2 | 12/2012 | Matlin et al. | |
| RE44,161 E | 4/2013 | Matlin et al. | |
| 8,424,787 B2 | 4/2013 | Matlin et al. | |
| 8,464,767 B2 | 6/2013 | Matlin et al. | |
| 9,643,190 B2 * | 5/2017 | Liu | B02C 23/04 |
| 2006/0180686 A1 | 8/2006 | Podrovitz | |
| 2007/0075168 A1 | 4/2007 | Rodriguez et al. | |
| 2008/0156911 A1 * | 7/2008 | Huang | B02C 18/0007 241/37.5 |
| 2010/0025509 A1 | 2/2010 | Matlin et al. | |
| 2010/0090039 A1 | 4/2010 | Jensen | |
| 2010/0140383 A1 | 6/2010 | Matlin et al. | |
| 2010/0181400 A1 | 7/2010 | Davis et al. | |
| 2012/0056026 A1 | 3/2012 | Matlin et al. | |
| 2013/0020423 A1 | 1/2013 | Aries et al. | |

FOREIGN PATENT DOCUMENTS

| | | |
|---|---|---|
| CN | 102861646 A | 1/2013 |
| GB | 2486990 | 7/2012 |

* cited by examiner

PRIOR ART

US 9,981,268 B2

SAFETY SHREDDER WITH MECHANICAL BIN-FULL DEVICE

CROSS-REFERENCE TO RELATED APPLICATIONS

This application is a Continuation-in-Part of U.S. application Ser. No. 13/850,993, filed Mar. 26, 2013, which claims priority of Jan. 15, 2013 to CN201310014059.1, CN201310014035.6, and CN201310014063.8 (all filed the same day), each of which is hereby incorporated by reference in its entirety.

BACKGROUND

1. Field of the Invention

The present invention relates to paper shredder, in particular, to a mechanical bin-full device of paper shredder.

2. Background Art

The shredder presently is a machine that is commonly used to destroy confidential documents. Generally, the shredder comprises a paper-shredding device and a waste bin. A fully-filled waste bin makes it difficult to continue the paper shredding, and high-piled scraps easily damage the paper-full detection device. The existing paper-full detection devices chiefly comprise two types: a mechanical one and an electronic one. The electronic paper-full detection device is fairly expensive and unstable, while the currently existing mechanical paper-full detection device has the shortcomings of being complicated in structure and inflexible to use.

In view of energy saving and safety, the shredder is usually provided with a time-delay switch and a safety switch of power-off function when the shredder head is lifted, but normally these two switches are installed separately, thus increasing the number of parts for the shredder and the manufacturing cost.

Meanwhile, the existing paper-full devices are individually set, thus a simply structured and easily operated paper-full mechanism that is able to be combinatorially set with other devices, such as the safety switch or time-delay switch for the shredder, with the power-off protection function actuating upon machine/bin separation, is needed.

SUMMARY

The embodiments herein provide a simple, inexpensive, and durable solution by implementing a mechanical bin-full detector.

A shredder is provided, having a shredder element, a bin, and a T-blade sensor. The shredder element has blades driven by an electric motor. The shredder element also has shredder input to the blades and a shredder output from the blades. The shredder input receives shreddables. The shredder output produces shreddant when the electric motor is operating. The bin is mechanically coupled to the shredder element, and receives the shreddant. The T-blade sensor is mechanically coupled to, and set apart from, the shredder element. The T-blade sensor also is electrically coupled to the electric motor. The T-blade sensor rotates to a predefined position to select an electrical contact such that the electric motor is non-operating when shreddant reaches a predetermined level in the bin. In embodiments, the T-blade sensor comprises a pendent blade perpendicularly affixed to a cylindrical body. The cylindrical body has an electrical sensor thereon, which is configured to electrically connect with electrical contacts on the shredder element. In other embodiments, the pendent blade is curved. In still other embodiments, the curved pendent blade is perforated with a plurality of holes.

In embodiments, the electrical sensor and electrical contacts form a switch coupled to the electrical motor. In some embodiments, a microcontroller is coupled to the switch. The microcontroller is configured to stop the electric motor when the T-blade sensor rotates to the predefined position and the switch is closed. In other embodiments, The microcontroller is configured to stop the electric motor when the T-blade sensor rotates to the predefined position and the switch is open.

In yet other embodiments, the switch is coupled between VCC and a first voltage divider resistor, the first voltage divider resistor is coupled to a first node, and the first node is coupled to a second voltage divider resistor. The first node is coupled to a base of a first transistor, and the second voltage divider resistor is coupled to ground. Also, a biasing resistor is coupled between VCC and a collector of a first transistor through a second node, the second node being coupled to a base of a second transistor, and an emitter of the first transistor is coupled to ground. Further, a motor relay is coupled between VCC and a collector of the second transistor, and an emitter of the second transistor is coupled to ground. In one condition, with the switch open, the motor relay is disposed to allow the electric motor to operate. However, in another condition, with the switch closed, the motor relay is disposed to disable the electric motor from operating.

DESCRIPTION OF THE DRAWINGS

Embodiments of the present invention disclosed herein are illustrated by way of example, and are not limited by the accompanying figures, in which like references indicate similar elements, and in which.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. In the figures, like numbers correspond to like elements.

DETAILED DESCRIPTIONS OF THE EMBODIMENTS

Below is an explanation of technical protocols for this invention through selected embodiments, but the following embodiments cannot limit the scope of protection of this invention.

Example Embodiment 1

Figure 1:
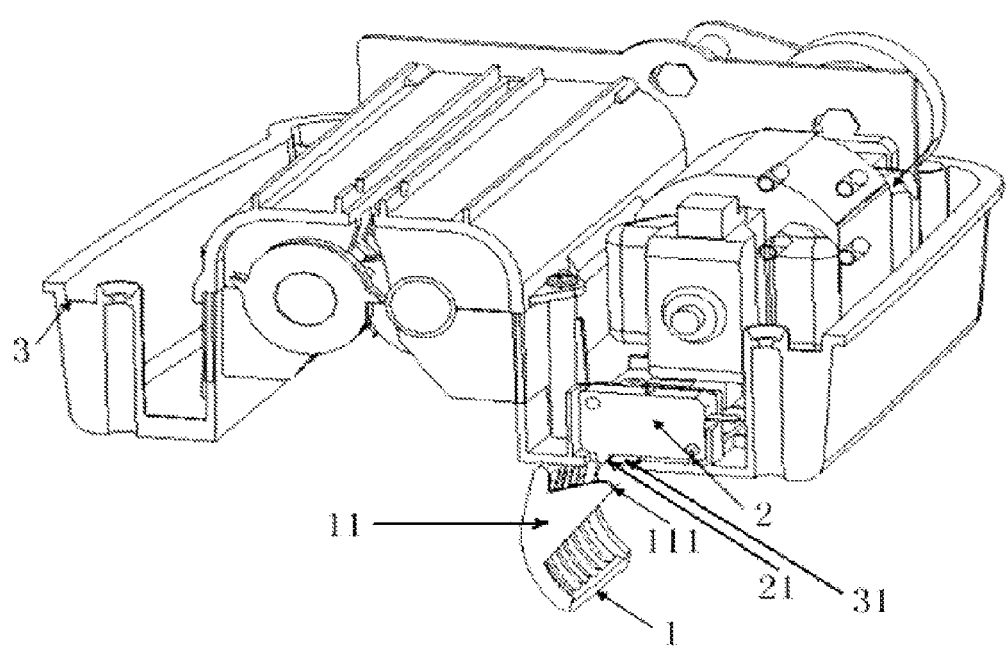
FIG. 1 is the cross-section view for the mechanical bin-full device of paper shredder in an embodiment, according to the teachings of the present invention.

In FIG. 1, the mechanical bin-full device of a paper shredder in this embodiment includes a pressing plate 1, a contact switch 2, and a touching part, which can be touching plate 11. Pressing plate 1 can be installed at the outside of the mechanical parts of the shredder under the lower housing 3 of the shredder, and parallel to the cutter shaft of the mechanical parts of the shredder, one end of which is connected to the lower housing 3 of the shredder through pivoting connection, such as rotation shaft, and the other end can freely swing. In other embodiments of the present invention, the pressing plate may be not parallel to the cutter shaft of the shredder. It can present a smaller, more acute, angle with the cutter shaft of the shredder.

A contact switch 2, fixed on the lower housing 3 of the shredder, and a contact point 21 is provided on one side of the contact switch 2 which is near the lower housing 3 of the shredder; the contact switch 2 is a micro-switch in this embodiment. A touching part is provided on one side of the pressing plate 1 which is away from the mechanical parts of the shredder, and in this embodiment, the touching part is installed perpendicular to the surface of the pressing plate 1; preferentially, in this embodiment, the touching part is a touching plate 11, which is provided with a tip part 111 which is used to touch the contact point 21 of the contact switch 2. The lower housing 3 of the shredder is provided with a through-hole 31 under the contact point 21 of the contact switch 2, enabling the touching plate 11 to touch the contact point 21 of contact switch 2, and under the driving of paper waste cumulated in the paper waste bin of the shredder, the pressing plate 1 turns around the rotation shaft, making the touching plate 11 installed on the pressing plate 1 touch the contact point 21 of contact switch 2 and making the shredder power off and stop running. In this embodiment, the cross section of the pressing plate 1 can be arc-shaped, which backs to the mechanical parts of the shredder, and the touching plate 11 can be installed in the inside of the arc-shaped pressing plate 1. In addition, in this embodiment, the pressing plate 1 has multiple holes, which can be arranged evenly. In this embodiment, these holes are long holes and in other embodiments they also can be round holes or any other suitable holes of any shape. In this embodiment, the width of pressing plate 1 can be shorter than the length of the cutter shaft of shredder, for example, its width can be from about ⅕ to about ⅓ of the length of the cutter shaft of shredder, and typically the pressing plate 1 can be installed in a position close to the middle. That the width of pressing plate is shorter than the length of the cutter shaft of shredder not only saves the material and makes it more portable. This configuration makes the pressing plate easily uplifted by the shredded paper as paper accumulates. It also reduces the probability of the pressing plate being damaged in the transportation process. When the pressing plate is set at the middle, the sensitivity of the paper shredder mechanical bin-full device is increased.

Figure 2A:
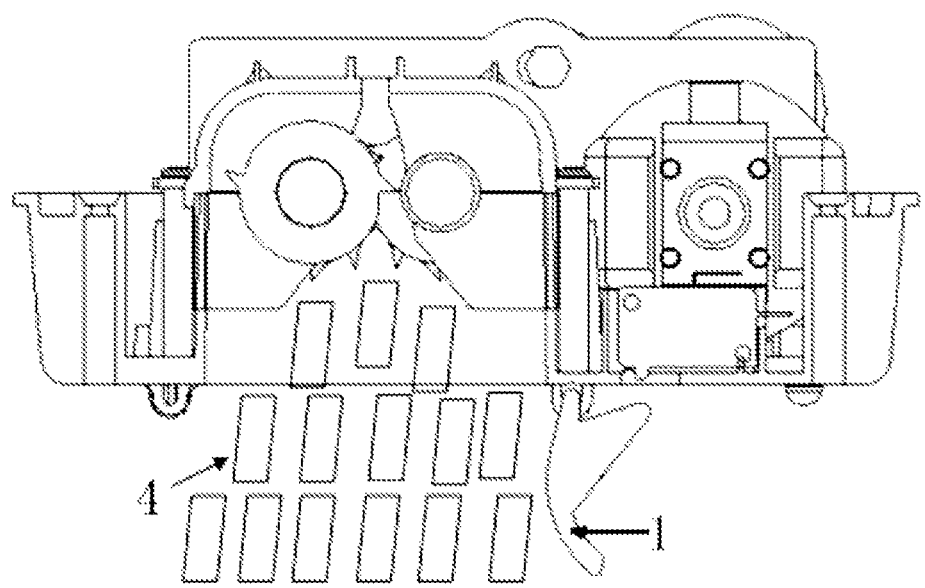
FIG. 2A and FIG. 2B are cross-sectional diagrams for a paper shredder mechanical bin-full device in a first and a second embodiment, according to the teachings of the present invention.
Figure 2B:
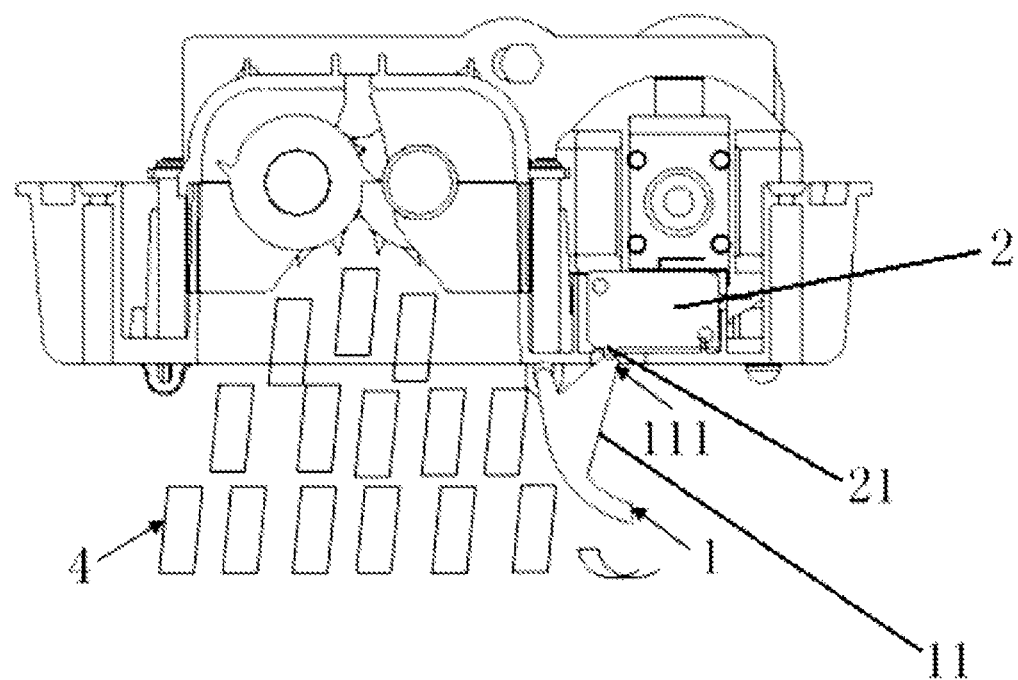
Figure 3:
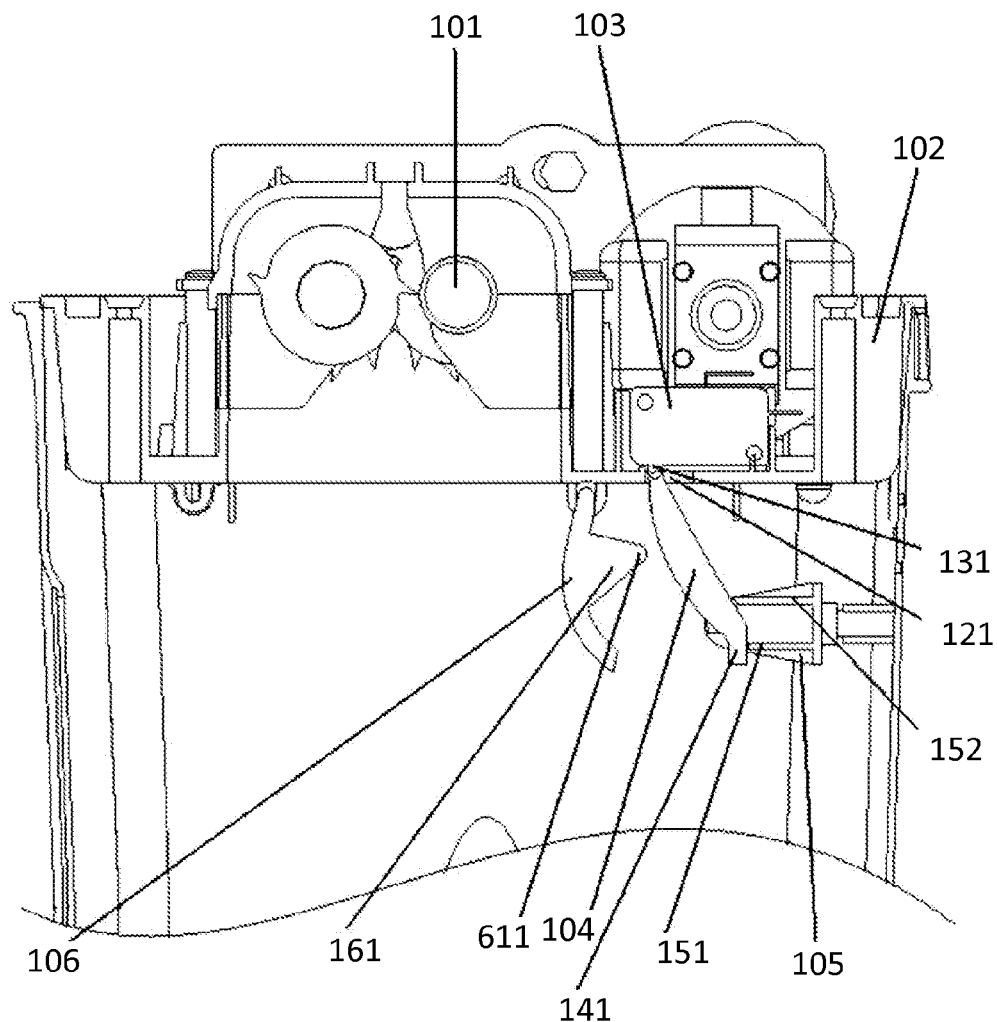
FIG. 3 is a cross-sectional diagram of a third embodiment of a mechanical shredder bin-full device, according to the teachings of the present invention.
Figure 4:
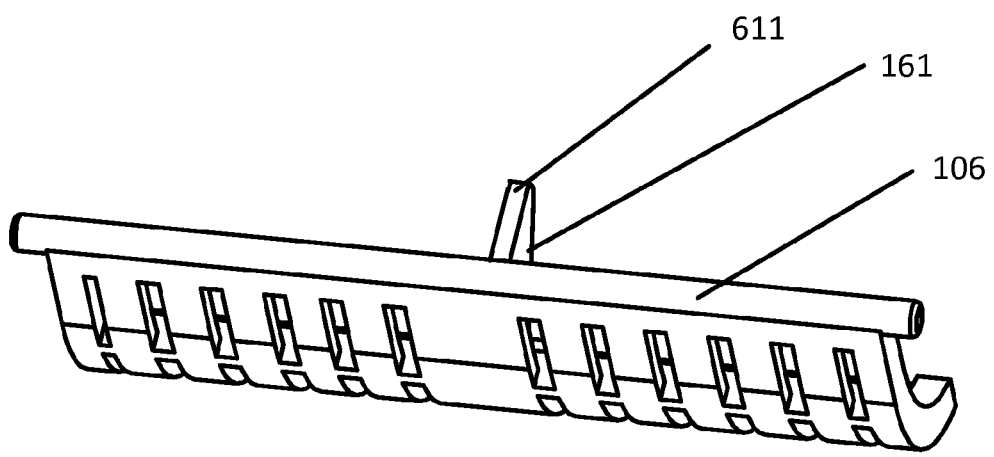
FIG. 4 is a perspective drawing of an arc-shaped pressing plate as described for the third embodiment, according to the teachings of the present invention.

Referring to FIG. 2A, when the paper shredder begins to run, the shredded paper waste 4 are minimal and the pressing plate 1 generally is not pressed, thus allowing the shredder to continually work. During shredding, shredded paper waste 4 is increased. When waste 4 reaches a certain volume, shredded paper waste 4 can drive the pressing plate 1, making the pressing plate 1 turn along the connecting shaft of the pressing plate 1 and the lower housing 3 of shredder. As the height of shredded paper waste 4 increases, it continues to push forward the pressing plate 1, making the tip part 111 of the touching plate 11 on the pressing plate 1 rise until the tip part 111 touches the contact point 22 of contact switch 2, shown in FIG. 2B, which makes the shredder power turn off and the shredder stop running. At that time, the user can clear away the shredded paper in the paper waste bin, and thereafter, because there is no pushing force of shredded paper waste, the pressing plate 1 will return and fall to its natural status, ready for the next cycle of paper shredding.

Example Embodiment 2

The difference of this embodiment from example Embodiment 1 is that the touching part installed on the pressing plate is a touching rod.

Example Embodiment 3

Figure 5:
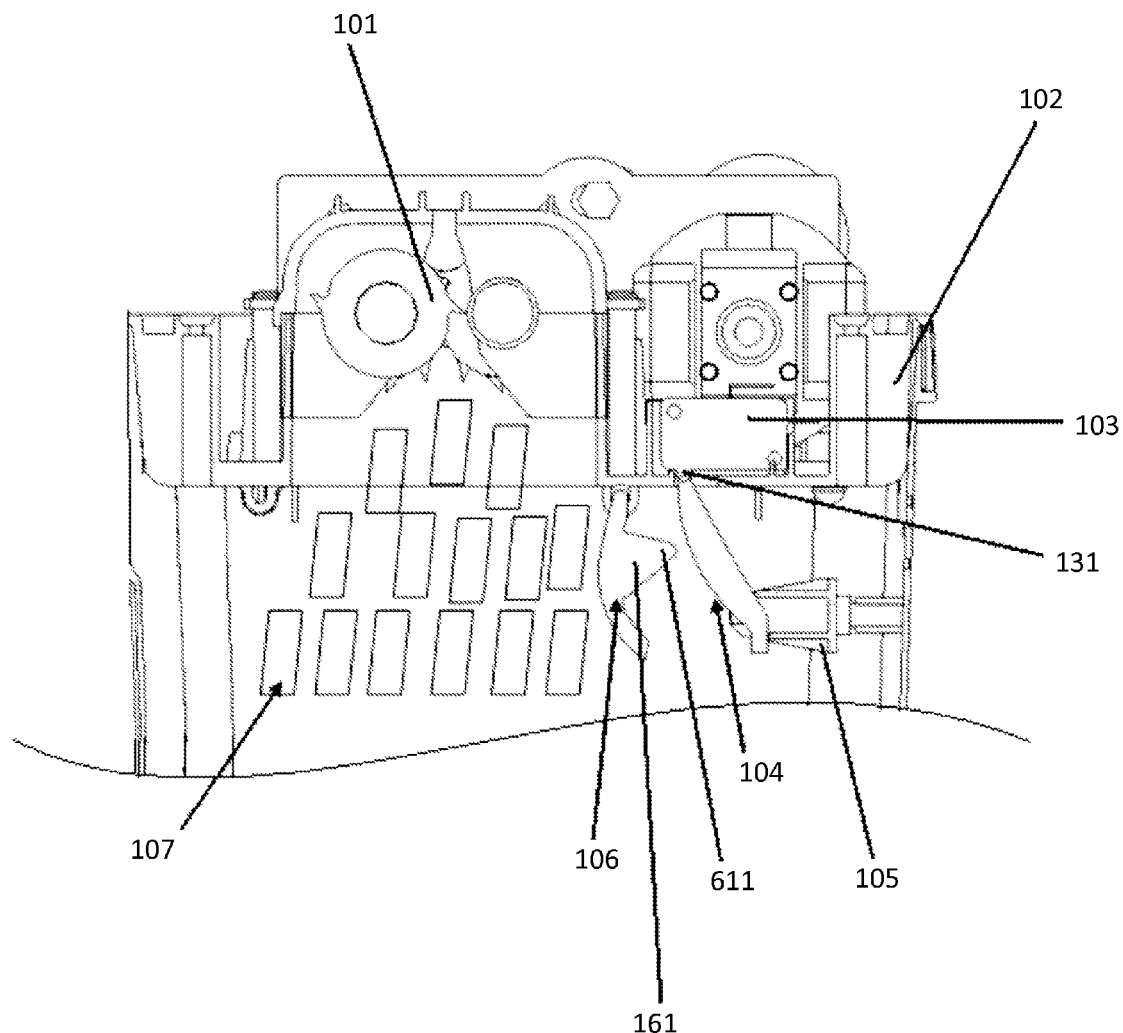
FIG. 5 and FIG. 6 are cross-sectional drawings of the shredder mechanical bin-full device of the third embodiment, according to the teachings of the present invention.
Figure 6:
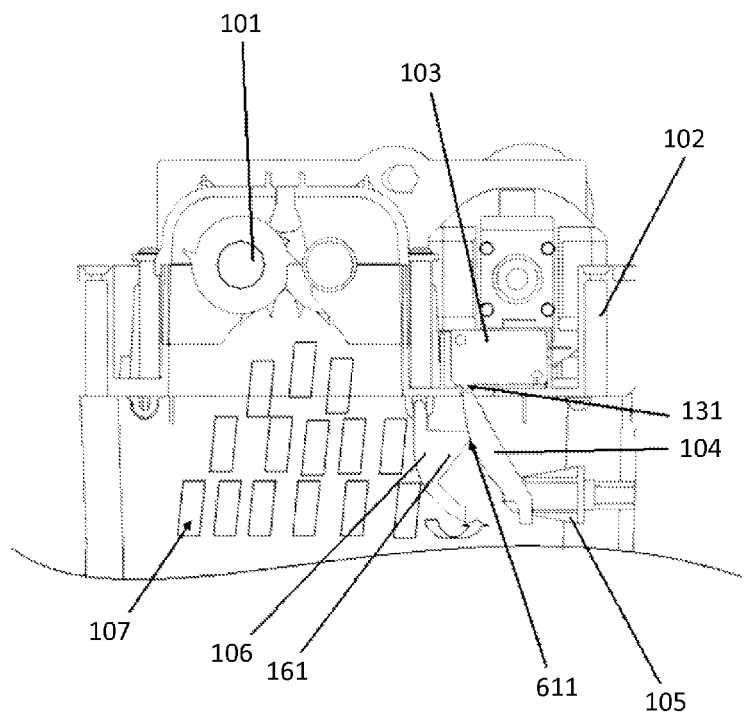
Figure 7:
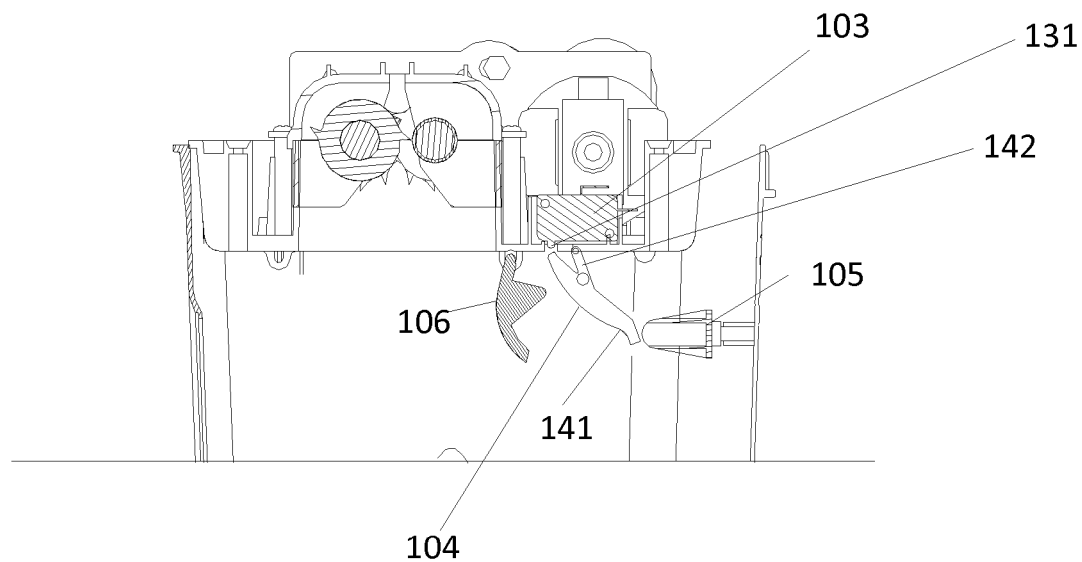
FIG. 7 and FIG. 8 are cross-sectional drawings of another shredder mechanical bin-full device implementation as illustrated in a third embodiment, according to the teachings of the present invention.
Figure 8:
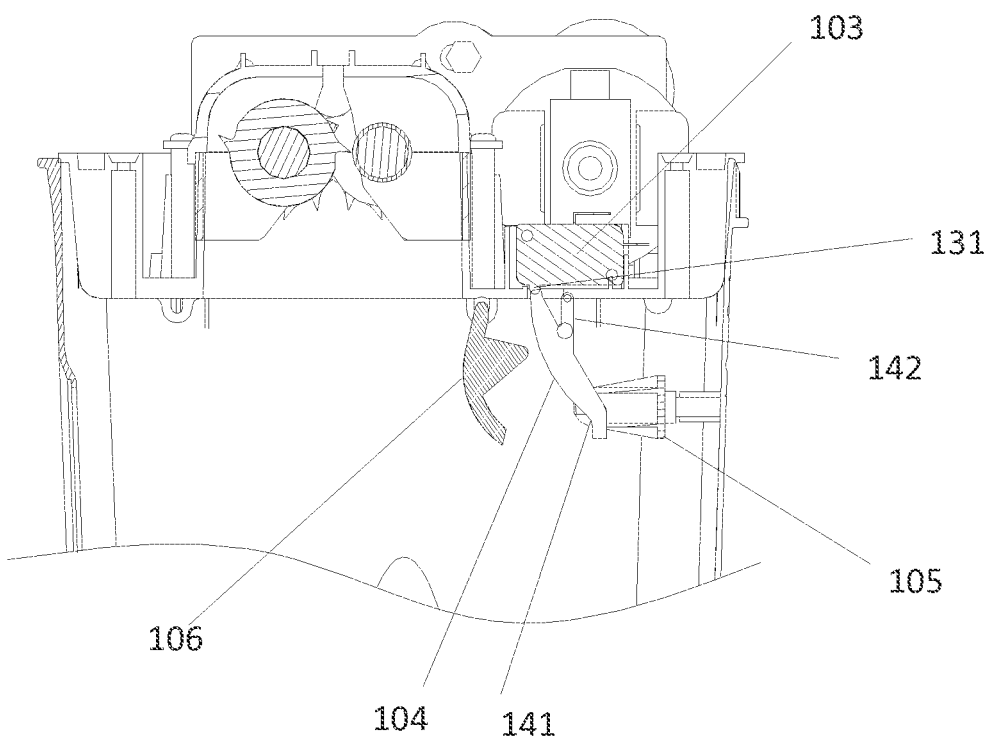
Figure 9:
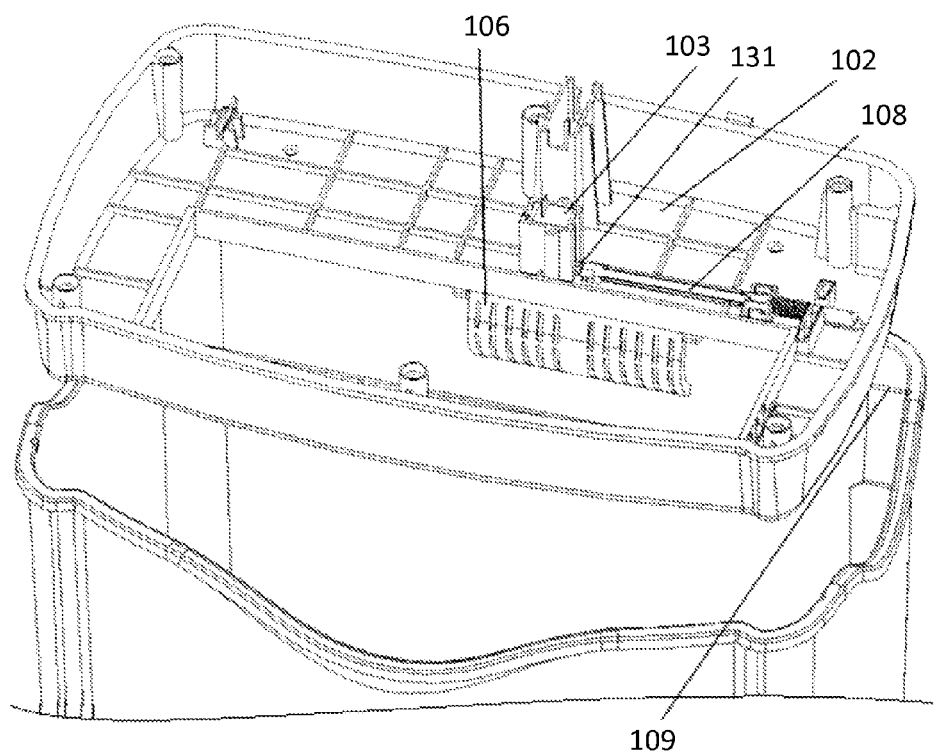
FIG. 9 is a perspective view drawing of the fourth embodiment of a shredder mechanical bin-full device, according to the teachings of the present invention.
Figure 10:
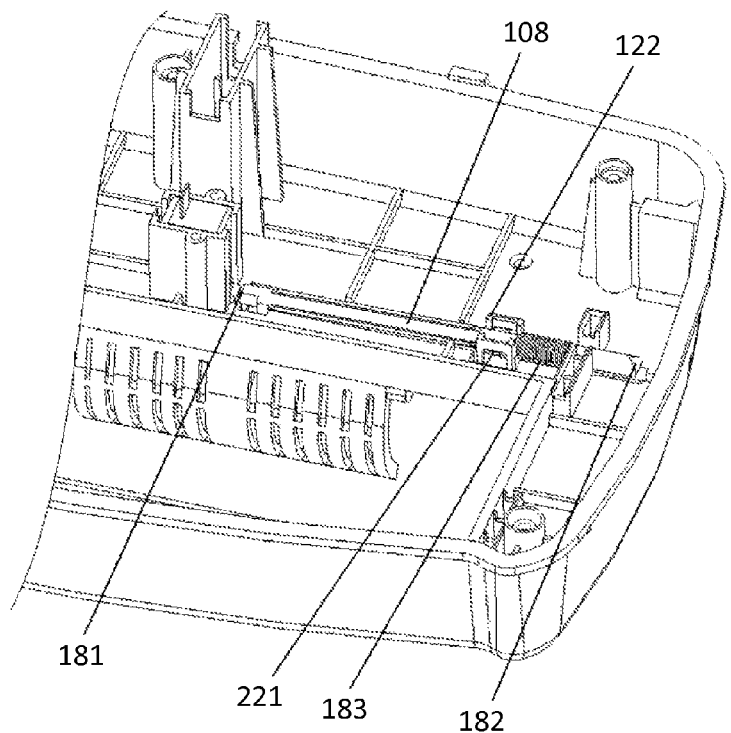
FIG. 10 is a perspective view drawing of the connecting rod and its connection relationship described in a fourth embodiment, according to the teachings of the present invention.
Figure 11:
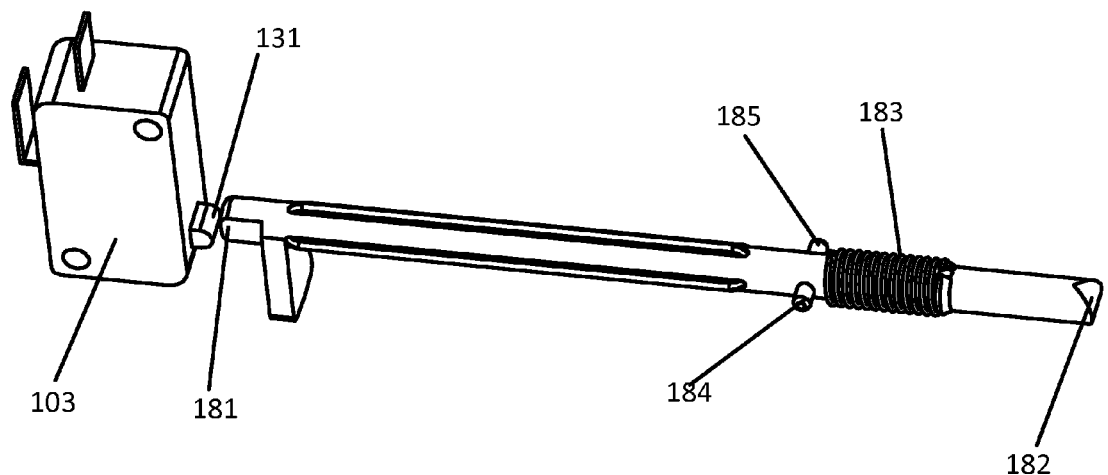
FIG. 11 is a perspective view drawing of the connecting rod and safety switch linkage as described in a fourth embodiment, according to the teachings of the present invention.

As shown in FIG. 3-6, the shredder in this embodiment includes the mechanical parts of the shredder 101, the lower housing 102 of the shredder, as well as the shredder mechanical bin-full device. FIG. 5 and FIG. 6 are cross-sectional drawings of the application processes of the paper-full detection functions by the shredder mechanical bin-full device. FIG. 7 and FIG. 8 are drawings of the structure by another mechanical bin-full device of shredder and on the application processes of the paper-full detection functions by another implementation of a shredder mechanical bin-full device.

The mechanical bin-full device of this embodiment chiefly consists of a contact switch, a touching device, and a pushing device. The contact switch, which is a safety switch 103 in this embodiment, may be fixedly installed on the lower housing of the shredder 102. The safety switch 103 is equipped with a contact point 131 that is to be contacted when the shredder head is put into the waste bin so that the shredder is powered on to function. When the shredder head separates from the waste bin, the contact point 131 of the safety switch 103 is released, thus enabling the shredder to be powered off. Whether the contact point 131 is trigged or not is used by the safety switch 103 to control the power-on or power-off for the shredder.

A touching device, which is a poke rod 104 in this embodiment, can contact or depart from the contact point 131 of the safety switch 103, thus enabling the shredder to be powered on or powered off, detailing in this embodiment as follows: the lower housing of the shredder 102 is set with a through hole 121 in the corresponding position under the contact point 131 of the safety switch 103. One end of the poke rod 4 passes through the through hole 121, ensuring the contact point 131 of the safety switch 103 to be contacted or released (e.g. released by the poke rod being pushed to move). The other end of the poke rod 104 is installed by a support 105 at the inner side of the shredder waste bin, wherein the support 105 can either be detachably mounted to the inner side of the shredder waste bin, or may be nondetachably fixed to the inner side of the shredder waste bin, or be integrally molded by injection along with the shredder waste bin. The poke rod 104 is pivotally connected to the support 105 through a rotation axis and it can rotate around the support 105 within a definitive scope.

The rotating scope of the poke rod 104 is limited by a first restriction member and a second restriction member placed on the support 105. In this embodiment, both the first restriction member and the second restriction member are limit bars, marked as the limit bar 151 and the limit bar 152. The limit bar 151 is transversely installed on the support 105. The poke rod 104 has a vertical part 141, one side surface of which is prop up one end of the limit bar 151. The relative position of the limit bar 151 and the vertical part 141 is set to ensure that the poke rod 104 can touch the contact point 131 of the contact switch 103 when the shredder is in the normal working condition, and preventing the poke rod 104 from suffering the deviation from the position of the contact point 131 that is incurred due to its downward rotation by action of gravity. The limit bar 152 is used for restricting the moving distance of the poke rod 104 from the contact point 131 of the safety switch 103 upon the poke rod 104 being pushed, and set parallel to the limit bar 151. Certainly, the limit bar 151 and the limit bar 152 are not necessarily set parallel to each other, their setup manners can utilize any other ones that are suitable to play the same roles. Moreover, the limit bar 152 is not necessarily set components but optional. This is illustrated only for explanation, but not for definition.

The pushing device, which can be an arc-shaped pressing plate 106 in this embodiment, one end of which is pivotally installed through a rotation axis under the lower housing of the shredder 102 at the outer side of the mechanical parts of the shredder 101, and the other end of which is a free end. The cambered surface of arc-shaped pressing plate 106 backs to the mechanical parts of the shredder 101, and the pressing plate 106 is equipped with a touching element, which is a touching sheet 161 in this embodiment. The touching sheet 161 is installed in the direction perpendicular to the plate surface of the arc-shaped pressing plate 106, wherein one end of the touching sheet 161 is connected to the plate surface of the arc-shaped pressing plate 106, and the other end has a tip part 611 that can push the poke rod 104 when the paper waste inside the shredder waste bin pushes the arc-shaped pressing plate 106 to rotate, enabling the poke rod 104 to depart from the contact point 131 of the safety switch 103.

Typically, the width of the arc-shaped pressing plate 106 is less than the length of the cutter shaft of the shredder. For example, the width of the arc-shaped pressing plate 106 can be between about 1/5 to about 1/3 of the length of the cutter shaft of the shredder. Furthermore, the arc-shaped pressing plate 106 can be set under the lower housing of the shredder 102 and, at the side, aligned with the cutter shaft of the shredder and close to the middle. That the width of the pressing plate is less than the length of the cutter shaft of the shredder enables the weight of the arc-shaped pressing plate to be reduced, easy to be pushed by the shredded paper waste piled inside the waste bin, leading to more sensitive detection. This also can decrease the probability of the pressing plate being damaged in the course of transportation. That the pressing plate is placed in the middle part enables the shredded paper waste filling in the waste bin to be more effectively and accurately detected.

In this embodiment, the arc-shaped pressing plate 106 is configured with multiple holes. These holes may be waist-shaped. Also, as shown in FIG. 6, these holes may be evenly arranged. The setup of multiple holes can significantly reduce the weight of the arc-shaped pressing plate 106. The weight-reduction enables plate 106 to more easily to be pushed by the paper scrap gradually accumulating inside the waste bin, thus improving the sensitivity in terms of the paper-full detection. The configuration of evenly arranged holes with the same shapes can better contribute to processing and manufacturing.

In this embodiment, the principles that the shredder mechanical bin-full device is applied to achieve the power-off protection functions according to shredder head lifting are explained as below: As shown in FIG. 5, when the shredder head is put into the waste bin, one end of the poke rod 104 just contacts the contact point 131 of the safety switch 103 which powers on the shredder to initiate operation. When the shredder head is lifted, one end of the poke rod 104 departs from the contact point 131 of the safety switch 103, powering off the shredder to terminate operation.

In this embodiment, the principle and process that the mechanical bin-full device applied to the shredder with the integral waste bin to achieve the paper-full detection function are described as below: As shown in FIG. 7 and FIG. 8, when the paper shredding starts, the quantity of the paper waste 107 is fairly small. Therefore, the arc-shaped pressing plate 106 is not pressed and the shredder remains in the power-on state to continue working (see FIG. 7). With the gradual increase of the paper waste 107 inside the waste bin, when the quantity of the paper waste 107 becomes enough to push the arc-shaped pressing plate 106, the arc-shaped pressing plate 106 will rotate around the axis of it and the lower housing of the shredder 102. When it rotates to a preselected angle, the tip part 611 of the touching sheet 161 on the arc-shaped pressing plate 106 will contact and push the poke rod 104, enabling it to rotate around the support 105, thus enabling the poke rod 104 to release the contact point 131 of the safety switch 103 (see FIG. 6). In such case, the shredder is powered off to cease operation, which reminds the user that the paper waste bin are full and that it is necessary to pour out the waste for the continuing work of the shredder. After the paper scraps are poured out, the poke rod 4 will go back to the original position because of gravity. Because of the limiting action of the limit bar 151, the poke rod 104 can just contact the contact point 131 of the safety switch 103 when the shredder head is put into the waste bin so that the shredder can be powered on to operation.

The mechanical bin-full device also can be used on the shredder with the drawing-type waste bin, realizing the functions of power-off protection of machine/waste bin separation and paper-full detection. The structure of poke rod 104 can be modified slightly with respect to such functions, as is described with respect to FIG. 7. There is a branch component disposed on the poke rod 104 through pivot connection, e.g. a branch rod 142, one end of which is connected to the poke rod 104 via pivoting and the other end is connected to the lower housing of the shredder through pivot connection. Under such structure, principle for power-off protection function of machine/waste bin separation is as follows: in FIG. 7, when the waste bin is drawn out, the poke rod 104, under the function of its own gravity, departs from the contact point 131 of the safety switch 103, and the shredder powers off. In FIG. 8, when the waste bin is pushed into the waste bin accommodation space below the shredder, the limit bar 151 which is set on support 105 of the waste bin pushes the vertical part 141 of the poke rod 104, enabling the poke rod 104 to turn along the shaft of the poke rod 104 and the branch rod 142 as well as along the shaft of the branch rod 142 and the lower housing of the shredder. This action enables the upper end of the poke rod 104 to touch the contact point 131 of the safety switch 103, therefore powering on the shredder. In this embodiment, the principle for realization of paper-full detection function by the mechanical bin-full device of shredder including the above-mentioned improvement structure of poke rod applied to the integral waste bin of the shredder is as follows: when paper waste is not full in the waste bin of the shredder, the mechanical bin-full device maintains the same state as that when the waste bin is pushed into the accommodation space under the shredder. When the paper waste increases and pushes the arc-shaped pressuring plate 106 to turn to push poke rod 104, and poke rod 104 turns along the pivot of it and the branch rod 142, therefore, enabling the upper end of the poke rod 104 to depart from contact point 131 of the safety switch 103 and the shredder power off. At this point, paper waste in the waste bin can be poured out, so that paper shredding and paper-full detection can be carried out again.

By carrying out of paper-full detection test on the above mentioned mechanical bin-full device of shredder, it has been demonstrated that the device possesses favorable paper-full detection function, together with the function of excellent power-off protection during machine/waste bin separation.

Example Embodiment 4

As shown in FIG. 7-10, the shredder in this embodiment includes the mechanical parts of the shredder (not shown in the Figures), the lower housing 102 of the shredder, as well as the mechanical bin-full device of shredder. As shown in FIG. 7, the mechanical bin-full device for the shredder of this embodiment mainly includes a contact switch, a touching device, and a pushing device. The contact switch, which is a safety switch 103 in this embodiment, may be fixedly installed on the lower housing 102 of the shredder. The safety switch 103 can be equipped with a contact point 131 that is contacted when the shredder starts normally, and operates. Upon the shredder head separating from the waste bin, the contact point 131 of the safety switch 103 is released, thus enabling the shredder to be powered off. Whether the contact point 131 is trigged or not is used by the safety switch 103 to control the power-on or power-off of the shredder;

The touching device, which is a connecting rod 108 in this embodiment, is connected to the lower housing 102 of the shredder, the connecting rod 108 is set with a first end 181 and a second end 182, and the second end 182 is set with a elastic component, which is a spring 183 in this embodiment. There is a bar set at the waste bin corresponding to the second end 182 of the connecting rod 108. Through spring 183, connecting rod 108 can contact the contact point 131 of the safety switch 103 as squeezed by the bar of corresponding position set on the waste bin of the shredder (see FIG. 8), in detail, the lower housing 102 of the shredder is set with fixed connecting rod holder 122 which limits the movement of connecting rod 108, the connecting rod holder 122 includes two identical parts which are set separately at both sides of the connecting rod 108, and each part is set with a long shaped slot, for example, kidney-shaped slot 221. The connecting rod 108 is set with two columnar convex elements 184 and 185 which are adaptable to the kidney-shaped slots 221 (see FIG. 9). The two columnar convex 184 and 185 are assembled inside of the two kidney-shaped slots 221 respectively and can slide along the kidney-shaped slots 221.

Moreover, this structure also may serve as revolving shaft, enabling the connecting rod 108 to turn along a direction perpendicular to the undersurface of the shredder lower housing within a small angle range. The connecting rod 108 is also set with restriction convex, and the spring 183 is sheathed on the connecting rod 108, for detail, one end of the spring 183 is resisted against the connecting rod holder 122 of the shredder lower housing, with the other end resisted against the restriction convex disposed on the connecting rod 108. Because the waste bin of the shredder is set with a bar 109 at the second end of the corresponding connecting rod 108, and the lower housing of the shredder is set with through holes at the corresponding positions of the bottom surface. When the shredder is put into the waste bin, the bar 109 can squeeze the second end 182 of the connecting rod 108 inward, thereby, pushing the first end 181 of the connecting rod 108 to contact the contact point 131 of the safety switch 103, enabling the shredder to power on, at the moment spring 183 is compressed. When lifting the lower housing 102 of the shredder, one end of the spring 183 is resisted against the connecting rod holder 122 on the lower housing of the shredder, while the other end pushes away the restriction convex on the connecting rod 108 via the resilience force, thereby, pushes away the connecting rod 108, enabling the first end 81 of the connecting rod 108 to depart from the contact point 131 of the safety switch 103, and then, the shredder is powered off. The abovementioned is the principle of mechanical bin-full device applied for the power-off protection function of machine/waste bin separation to the integral waste bin shredder of this embodiment. If it is applied to the shredder with the drawing-type waste bin, the bar may be set on the drawing-type waste bin, and through holes may be set at the positions corresponding to the lower housing sides of shredder. When pulling the drawing-type waste bin away, the bar on the drawing type waste bin releases the connecting rod 108, enabling the shredder to be powered off; when pushing in the drawing-type waste bin, the bar on the drawing type waste bin presses the connecting rod 108, thus pushing the first end 181 of the connecting rod 108 to contact the contact point 131 of the safety switch 103, enabling the shredder to power off. Besides, the lower part of the connecting rod 108 is set with a convex part 186. When pushing the convex part 186 upon paper full condition, the connecting rod 108 can turn a certain angle along the direction which is vertical to the lower housing of the shredder, enabling the first end 181 of connecting rod 108 to depart from the contact point 131 of the safety switch 103, achieving the effect of enabling the shredder to power off.

The pushing device, which can be an arc-shaped pressing plate 106, one end of which is pivotally installed through a rotation axis at the outer side of the mechanical parts of the shredder (not shown) under the lower housing 102 of the shredder, and the other end of which is the free end. The cambered surface of the arc-shaped pressing plate 106 backs on to the mechanical parts of the shredder (not shown), in which is equipped with a touching element, which is a touching sheet 161 in this embodiment. The touching sheet 161 is installed in the direction substantially perpendicular to the plate surface of the arc-shaped pressing plate 106, one end of which is connected to the plate surface of the arc-shaped pressing plate 106, and the other end of which has a tip part 611 that can push the convex part 186 of the connecting rod 108 when the shredded paper waste inside the shredder waste bin pushes the arc-shaped pressing plate 106 to rotate, enabling the convex part to depart from the contact point 131 of the safety switch 103.

In this embodiment, width of the arc-shaped pressing plate 106 is less than the length of the cutter shaft of the shredder. The typical width of the arc-shaped pressing plate 106 is between about ⅕ to about ⅓ of the length of the cutter shaft of the shredder. The arc-shaped pressing plate 106 is set under the lower housing 102 of the shredder where it is positioned at the side aligned with the cutter shaft of the shredder and close to the middle. In this embodiment, the arc-shaped pressing plate 106 typically is set slightly near the connecting rod 108. The arc-shaped pressing plate 106 is configured with several holes which can be waist type holes arranged evenly (see FIG. 2). The set of several holes may notably reduce the weight of the arc-shaped pressing plate 106, enabling it to be more easily pushed by the shredded paper waste which is gradually accumulated in the waste bin, improving its sensitivity to detect the filling state of waste paper.

Figure 12:
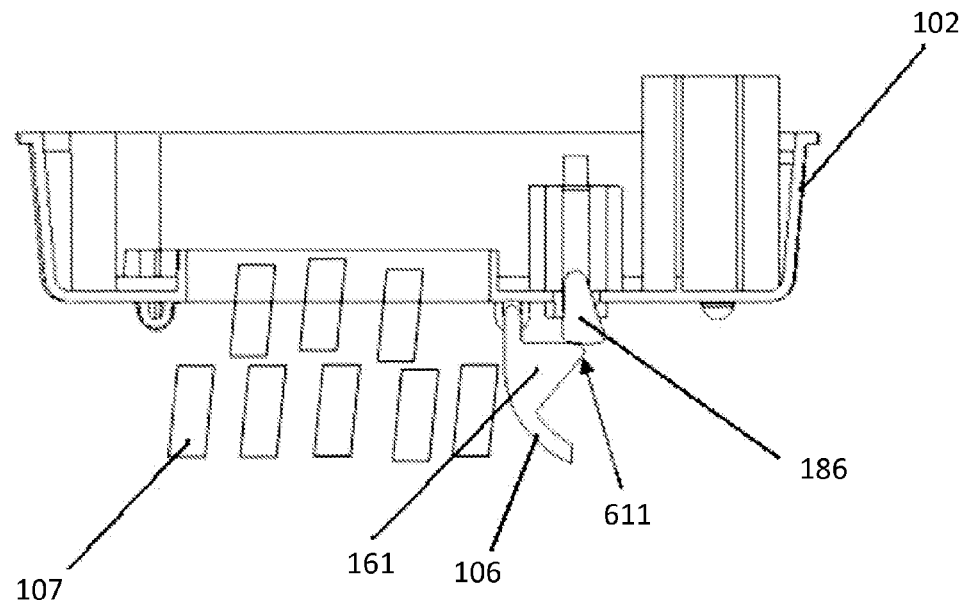
FIG. 12 is a cross-sectional drawing of the paper-full detection functions of the shredder mechanical bin-full device as described in a fourth embodiment, according to the teachings of the present invention.

The shredder mechanical bin-full device is set on the lower housing 102 of the shredder, therefore, operating principles for it to be used on the shredder with the integral waste bin and shredder with the drawing-type waste bin are similar. The specific principle and process are that: (see FIG. 12, FIG. 13A and FIG. 13B), when the paper shredding just starts, the volume of paper waste 107 is small, therefore, arc-shaped pressing plate 106 is not pressed, the shredder maintains the power-on status and operates continuously. With the gradually increasing of paper waste 107 in the shredder, when the paper waste reaches certain volume, it touches the arc-shaped pressing plate 106. The arc-shaped pressing plate 106 rotates around the shaft of the plate 106 and the lower housing 102 of the shredder, enabling the top part 611 of the touching sheet 61 to contact the convex part 86 of the connecting rod 108 (see FIG. 10). With the gradual increasing of the paper waste 107, it gradually pushes the arc-shaped pressing plate 106 to revolve, and the top part 611 of the touching sheet 161 of the arc-shaped pressing plate 106 lifts up the convex part 186 of the connecting rod 108 (see FIG. 13A), enabling it to revolve upward and depart from the contact point 131 of the safety switch 103 (see FIG. 13B), upon which the shredder is powered off and shuts down. The user is alerted that the paper waste is full and the shredder can only go on working when the paper scrap is poured out. When the paper waste is poured out, and the waste bin is pushed in or placed to its original place, the first end 181 of the connecting rod 108 contacts the contact point 131 of the safety switch 103 to proceed to the next paper shredding circulation.

Figure 13A:
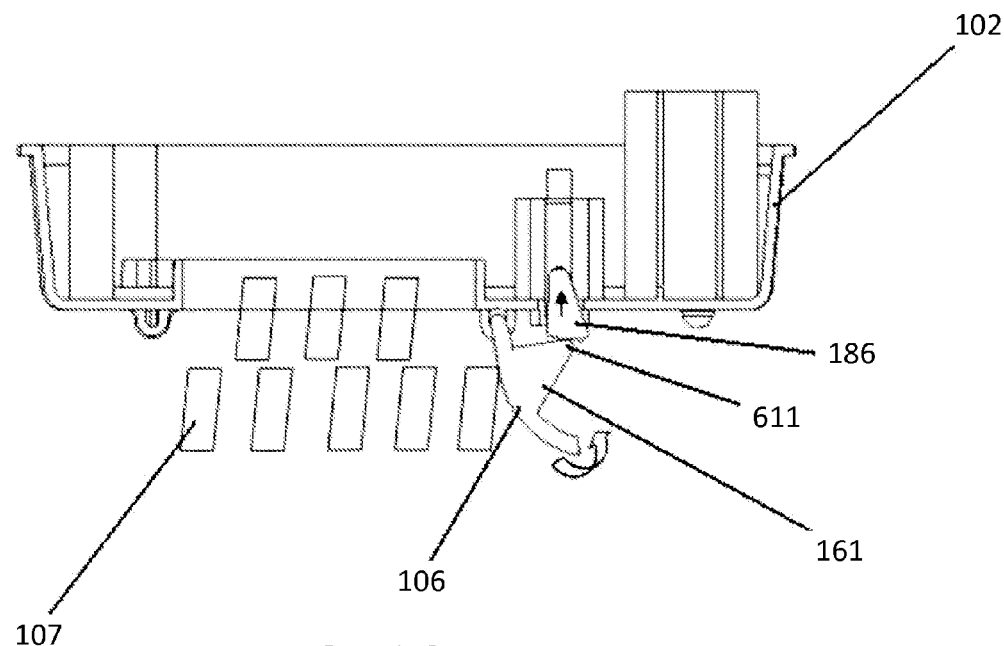
FIG. 13A and FIG. 13B are cross-sectional drawings of the paper-full detection functions of the shredder mechanical bin-full device of the fourth embodiment, in accordance with the teachings of the present invention.
Figure 13B:
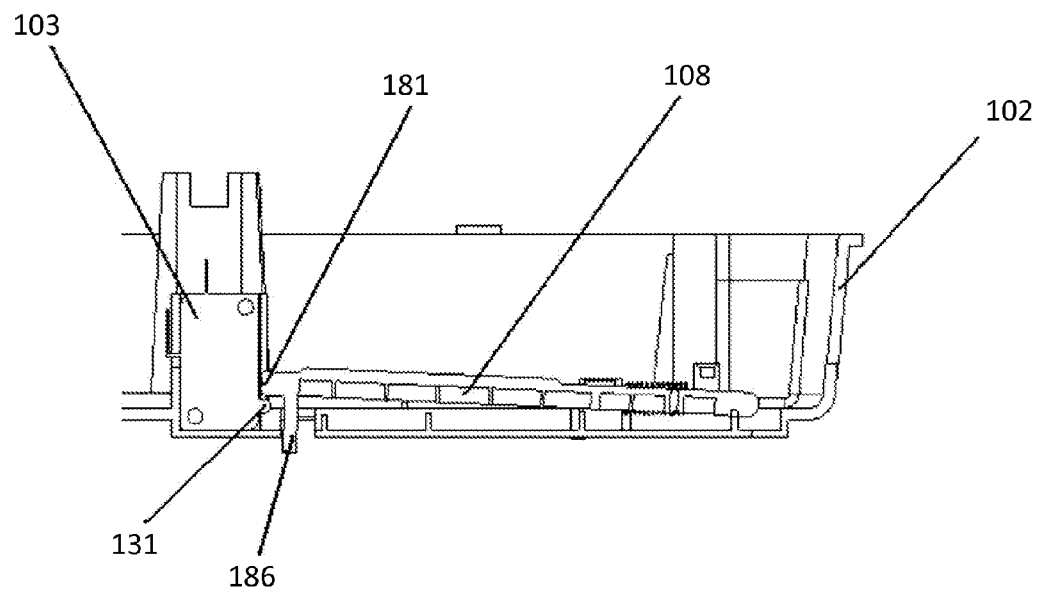

FIG. 13A and FIG. 13B are drawings based on the application processes of the paper-full detection functions by the mechanical bin-full device of shredder as described in the fourth embodiment, which respectively shows the conditions of the safety switch and connecting rod from different perspectives when the shredder is powered off.

All the components of the mechanical bin-full device for the shredder of this embodiment are set on the lower housing of the shredder, with a wider range of shredder model applicable and not limited by the set mode of the waste bin of the shredder.

Example Embodiment 5

Figure 14:
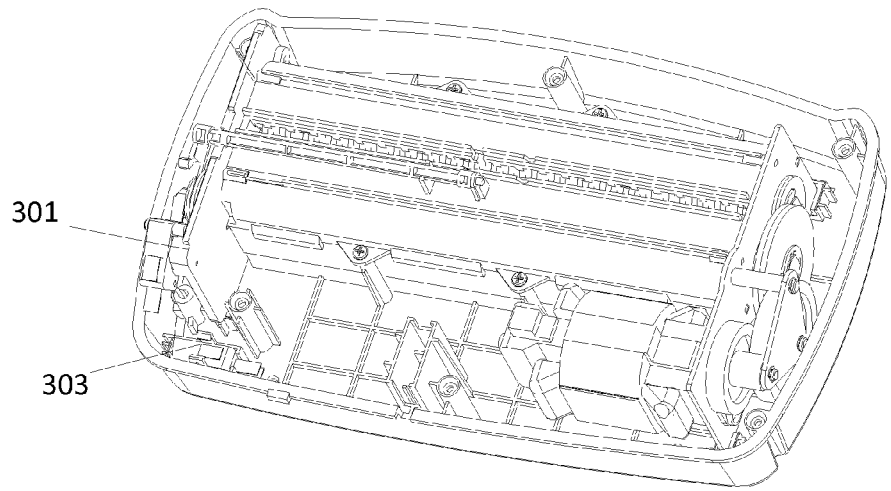
FIG. 14 is a perspective view drawing for the time-delay switch and the safety switch of the shredder in the prior art.

Turning to FIG. 14, a prior art shredder head is shown including separate time-delay switch 301 and safety switch 303 is shown. Requiring separate elements for the time delay switch and safety switch can increase costs and decrease reliability. The embodiments of the present invention provide for an integrated time-delay and safety switch.

Figure 15:
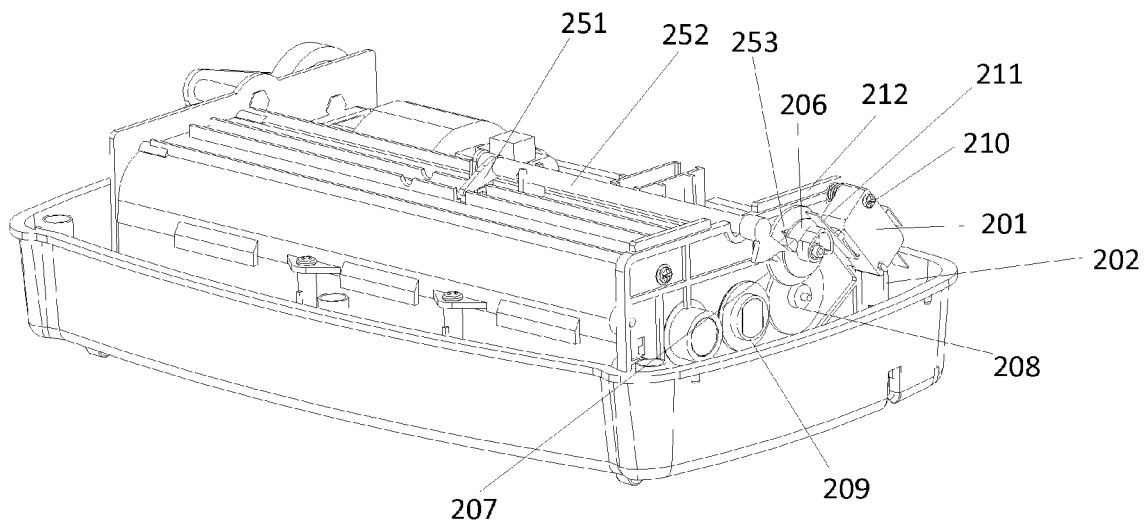
FIG. 15 is a perspective view of the time-delay mechanism of shredder integrated with a safety switch in an embodiment, according to teachings of the present invention.
Figure 16:
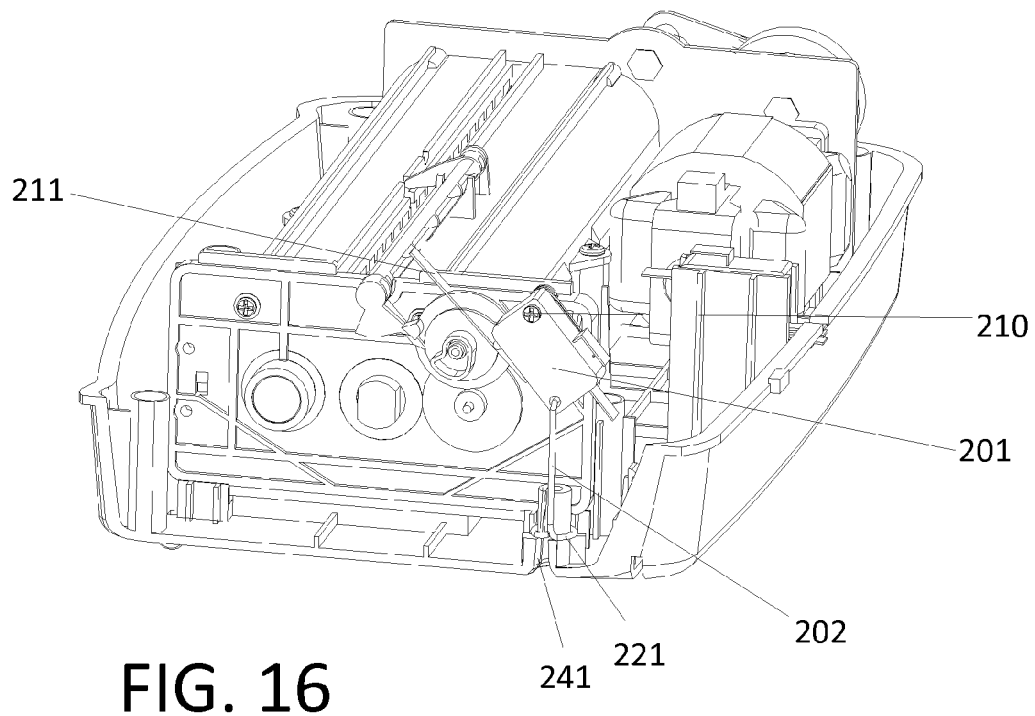
FIG. 16 is a perspective view of the time-delay mechanism embodiment when the shredder head deviates from the paper waste bin, according to teachings of the present invention.
Figure 17:
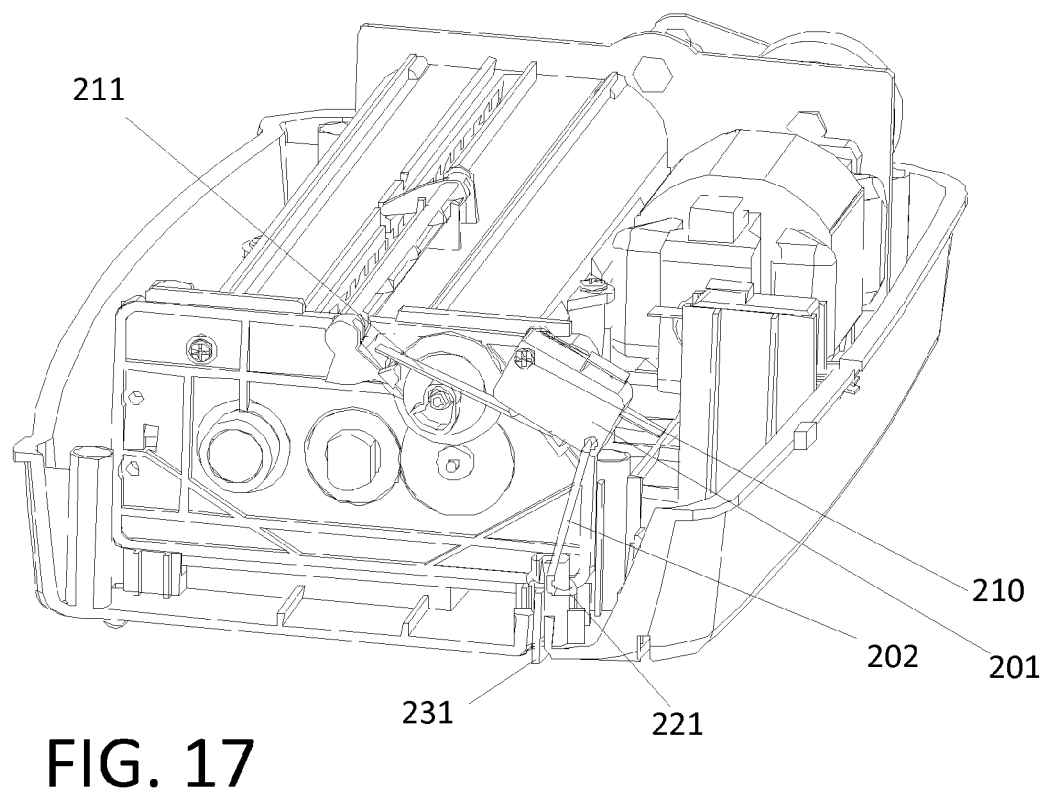
FIG. 17 is a perspective view drawing for parts of the time-delay mechanism of the embodiment of this invention after the shredder head is put into the paper waste bin, according to teachings of the present invention.

Referring to FIGS. 15 and 16, in this embodiment, the time-delay mechanism of shredder integrated with a safety switch of power-off function according to the lift of the shredder head, includes a time-delay switch body 201, which is pivot-connected to the side plate 212 of the shredder through a connecting pivot 210. The time-delay switch body 201 is provided with a forced rod 202. The paper waste bin of the shredder is provided with a support rib 231 (not shown in FIG. 15, see FIGS. 17-21) at the location corresponding to the forced rod 202. One end of the forced rod 202 is connected to the time-delay switch body 201 through pivoting connection and the other end is connected to the support rib 231 (not shown in FIG. 15, see FIGS. 17-21) by means of touch. When the shredder head is put into the paper waste bin, under the driving of the support rib 231, the forced rod 202 can drive the time-delay switch body 201 to rotate and leave it in contact state with the paper entrance. In this embodiment, the time-delay switch body 201 includes a contact piece 211, which rotates and joints to the time-delay switch body 201 and makes the time-delay switch body 201 closed, and the contact piece 211 revolves and deviates from the time-delay switch body 201 and makes it open. The forced rod 202 is provided with a ring-like assembly 21 (not shown in FIG. 15, see FIGS. 16-17) at one end where it is connected to the support rib 231 by means of touch. The ring-like assembly 221 (not shown in FIG. 15, see FIGS. 16-17) is installed on a hollow cylinder 241 (not shown in FIG. 15, see FIG. 16) set at the lower housing of the shredder and its tail end stretches into the cavity of the hollow cylinder 241 (not shown in FIG. 15, see FIG. 16). The above installation mode of the tail end of the forced rod which is connected to the support rib by means of touch and the lower housing of the shredder is only an example. Any suitable structure in which the support rib on the paper waste bin of the shredder can lift up the forced rod and then make the time-delay switch body 201 rotates and keep in the contact state in case of paper entering is within the scope of this invention.

In this embodiment, the time-delay mechanism of shredder integrated with a safety switch typically includes a contact component with the paper entrance, which includes a contact part 251 at paper inlet, a connecting rod 252 and a push button 253. Two ends of the connecting rod 252 are fixed respectively to the contact part 251 at paper inlet and the push button 253, and the push button 253 can drive the time-delay switch body 201 during entering of paper and make it closed.

The time-delay mechanism also typically includes a time-delay component, which includes a cam 206 and a gear 207. The cam 206 and the gear 207 generally rotate synchronously in the same direction, and the gear 207 is engaged with the cutter shaft gear 209 of the shredder through a reduction gear 208.

Figure 18:
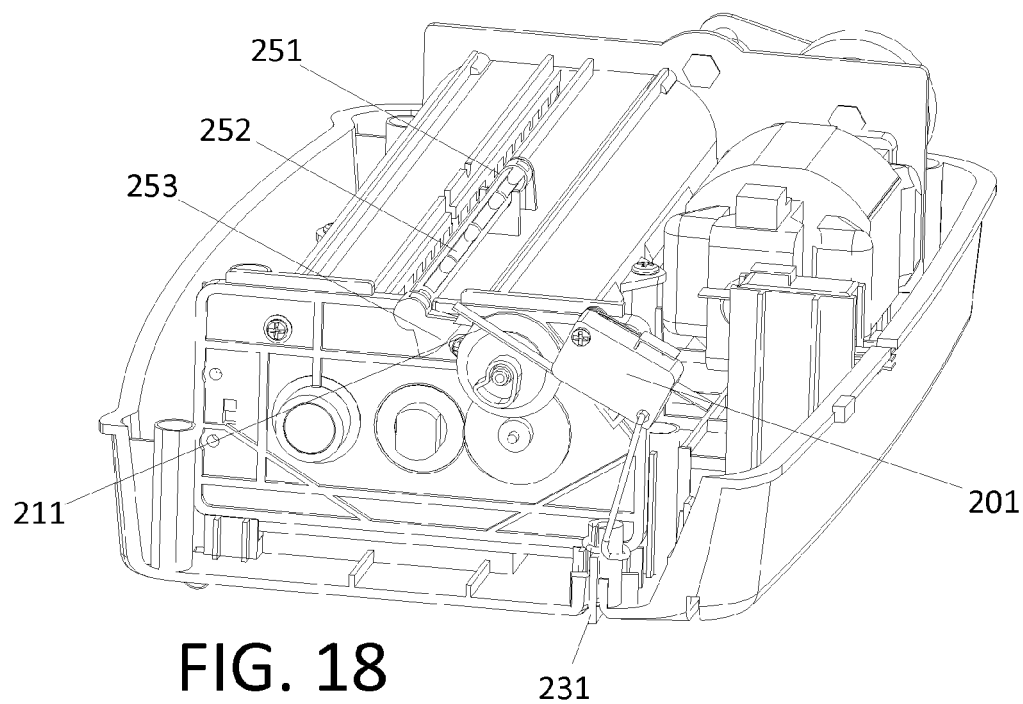
FIG. 18 is a perspective view drawing for parts of the time-delay mechanism of the embodiment of this invention during paper entry, according to teachings of the present invention.
Figure 19:
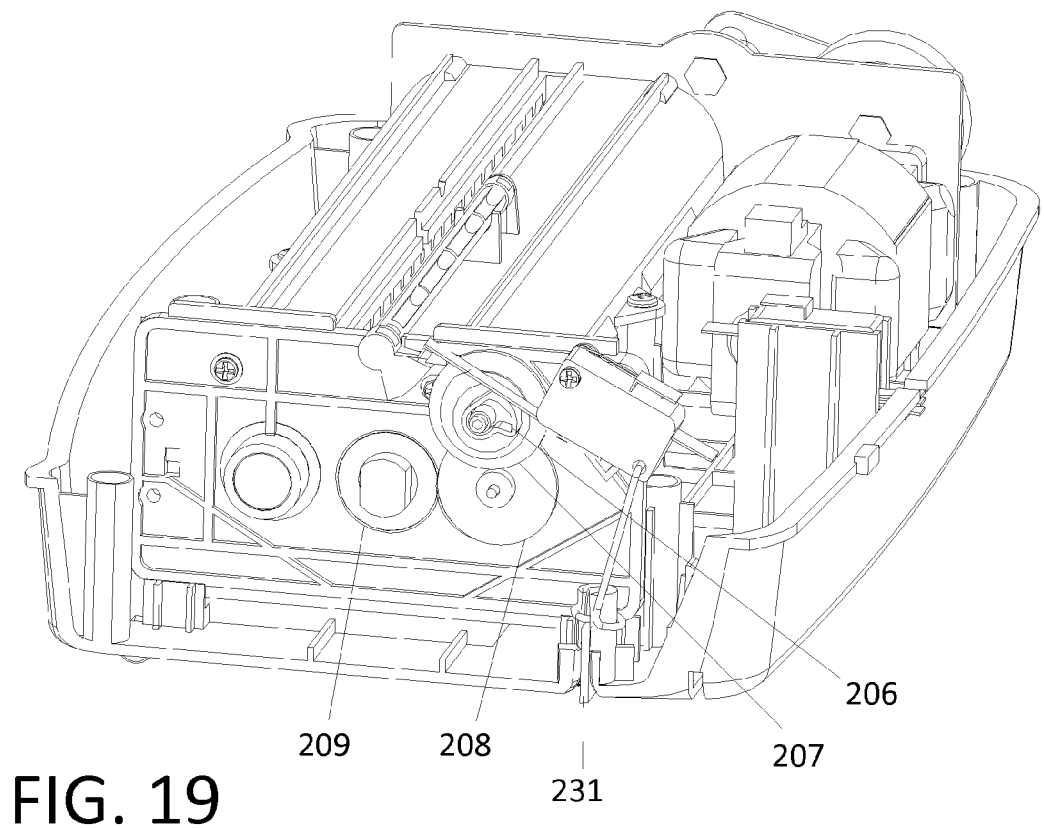
FIG. 19 is a perspective view drawing for revolution of the time-delay mechanism in the paper shredding process in the embodiment, according to teachings of the present invention.
Figure 20:
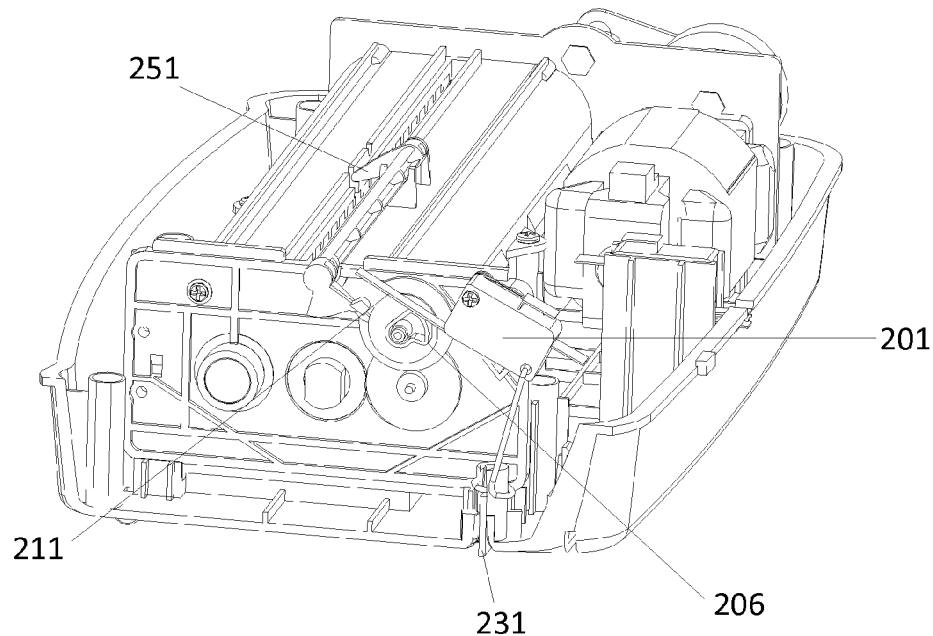
FIG. 20 is a perspective view drawing for parts of the time-delay mechanism of the embodiment of this invention when the paper fully enters into the shredder and the contact part returns and delays, according to teachings of the present invention.
Figure 21:
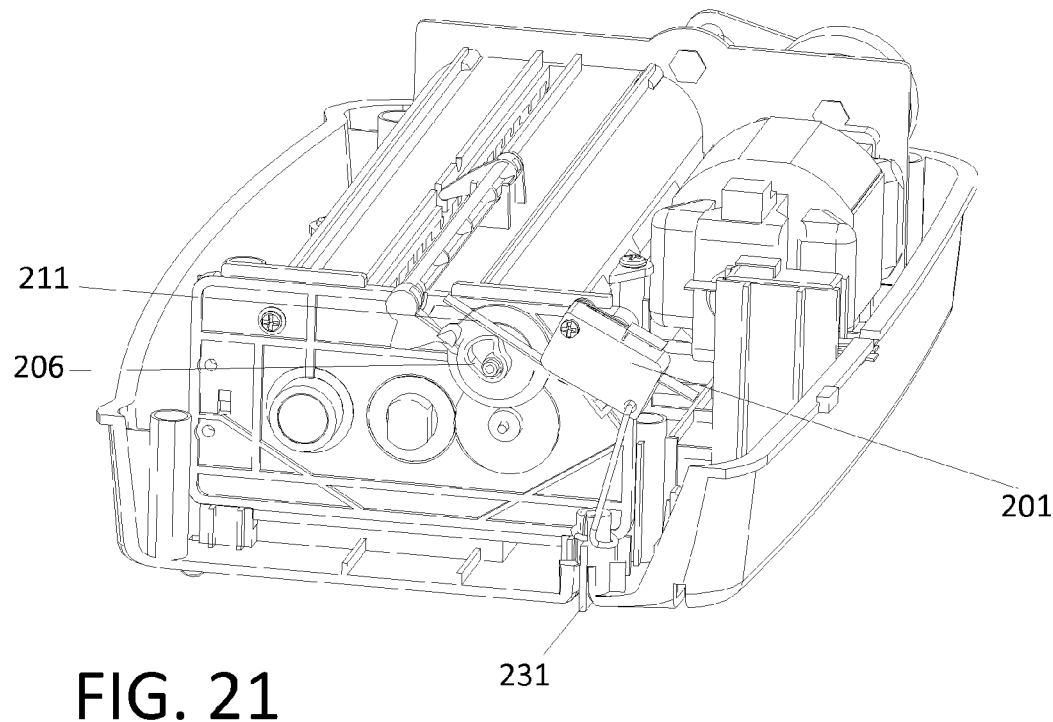
FIG. 21 is a perspective view drawing of the time-delay mechanism of the embodiment of this invention when the time-delay switch body disconnects following the end of time delay, according to teachings of the present invention.

The working principle and process for the time-delay mechanism of shredder integrated with a safety switch of this embodiment are as follows: referring to FIG. 16, when the shredder head deviates from the paper waste bin, the forced rod 202 is not driven by the support rib 231 (not shown in FIG. 16, see FIGS. 17-21). The time-delay switch body 201 revolves downwards along the connecting shaft 10 due to its gravity and makes the contact piece 211 on it depart from the time-delay switch body 201, making the time-delay switch body 201 open, and then the shredder is powered off. When the shredder head is put into the paper waste bin, the tail end 221 of the forced rod 202 is lifted up by the support rib 231 on the paper waste bin and makes the forced rod 202 uplift. Under the upward pushing force, the time-delay switch body 201 revolves to a preselected angle around the connecting shaft 10, which makes the time-delay switch body 201 achieve the deflection angle at which the shredder does not shred any paper in the normal state, i.e. the contact state when is paper entering, as shown in FIG. 7. When there is paper put at the paper inlet, the contact part 251 at paper inlet is depressed by the paper and makes the push button 253 revolve upwards through the connecting rod 252. This action drives the contact piece 211 of the time-delay switch body 201 and makes it rotate and joint to the time-delay switch body 201, thus making the time-delay switch body 201 closed. Then, the shredder is powered on and begins the paper shredding, as shown in FIG. 18. In the paper shredding process, the time-delay component (the cam 206 and the gear 207 revolving in the same direction) turns with the rotation of the cutter shaft of the shredder under the driving action of the shredder cutter shaft gear 209 and the reduction gear 208, as shown in FIG. 19. When the paper fully enters into the mechanical part of the shredder, the contact part 251 at paper inlet bounces and begins the time delay. The cam 206 of the time-delay mechanism of the shredder resists the contact piece 211 of the time-delay switch body 201, and so the shredder remains powered on and its cutter shaft continues to revolve, thus the cam 206 revolves as well, as shown in FIG. 20. The contact piece 211 leaves the time-delay switch body 201 due to its gravity and makes the time-delay switch body 201 open, until the cam 206 revolves to departing from the contact piece 211 of the time-delay switch body 201 and cannot resist the contact piece 211, ending the time delay, as shown in FIG. 21. The shredder now is powered off.

Through the installation of a forced rod, these embodiments uses one switch to achieve not only the power-off function according to the lift of the shredder head but also the contact function when paper entering, and also ensure the time-delay effect in paper shredding. It is easy for use with high efficiency and saves cost as well.

Except for the above mode of execution, the idea that the time-delay switch of shredder integrated with a safety switch installed on the forced rod which is linked with the shredder's paper waste bin is also applied to any suitable time-delay mechanism with contact function when paper entering; the above embodiments are only used for illustrating the contents of this invention; except for the above mode of execution, this invention has other modes of execution; all technical protocols formed in the mode of equal replacement or equivalent transformation are within the scope of protection of this invention.

Example Embodiment 6

Figure 22:
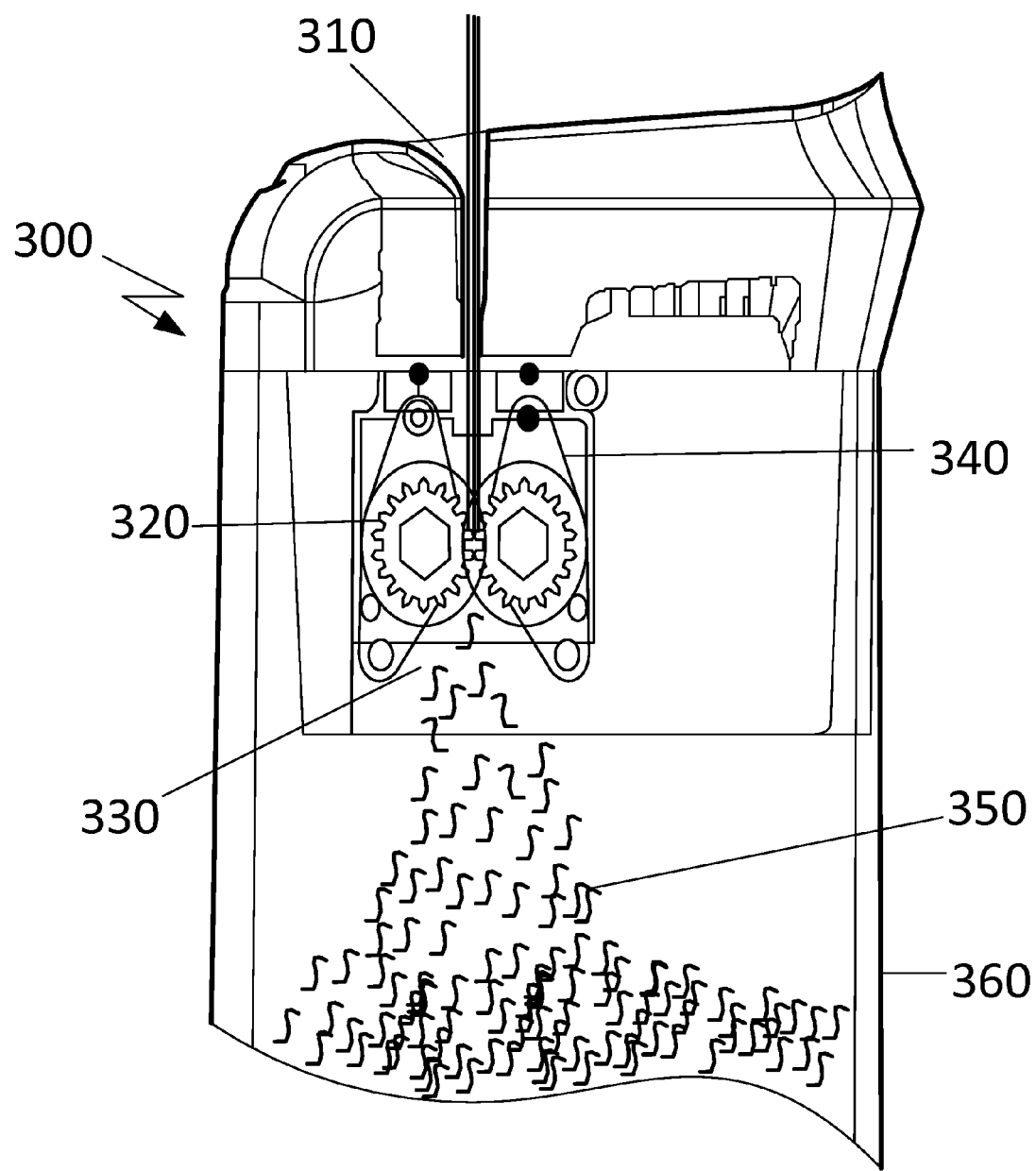
FIG. 22 is a cut-away side view of a shredder, in accordance with an embodiment of the present invention.

Turning to FIG. 22, shredder 300 has input opening 310, shredding element with moving blades 320, and output opening 330. The shredding element blades 30 are motivated by an electrical motor 340 mechanically coupled thereto. Shredding occurs when motor 340 is electrically energized. Shredder 300 receives shreddable products (shreddables) and produces shredded material (shreddant) 350 Shredding element 320 can be disposed upon a bin 360 intended to receive shreddant created by the shredding element.

Figure 23A:
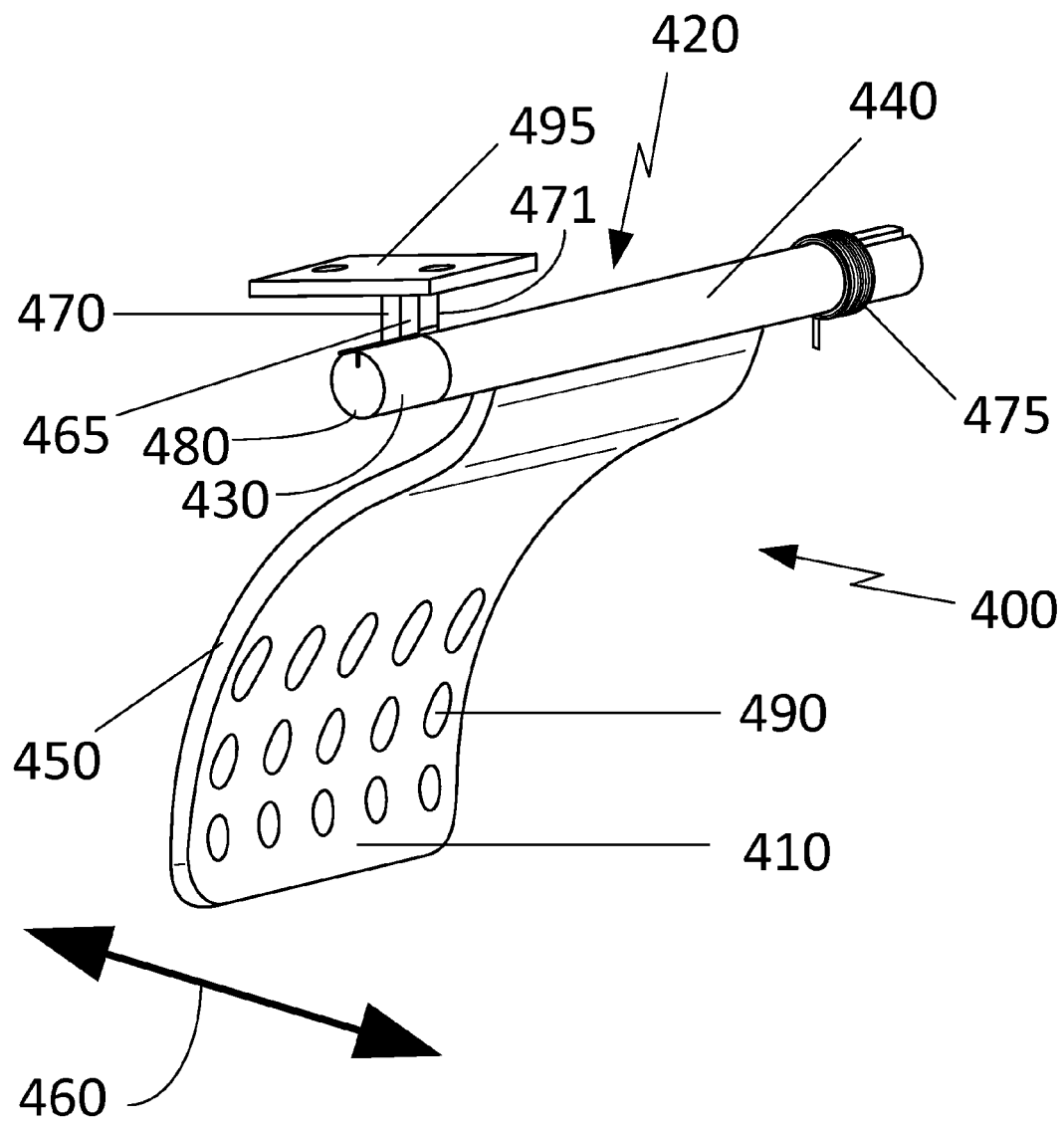
FIG. 23A is a perspective view of a T-blade sensor in the shredder enabled position, in accordance with the teachings of the present invention.

Turning to FIG. 23A, and also with reference to FIG. 22, T-blade 400 can have pendent blade portion 410 and cylindrical body 420. T-blade 400 can be disposed set apart from the shredder output opening 330. Pendent blade portion 410 may partially intrude into the bin 360, but it is not required to do so. Pendent blade portion 410 can be formed with curve 450. Cylindrical body 420 can include conductive endpiece 430 and non-conductive portion 440. In embodiments, conductive endpiece 430 may be a non-closed annular metal sheet 480 partially disposed on cylindrical body 420, which may be non-conductive. Sheet 480 may be copper, but it is not required to be. T-blade 400 can act as a bin-full sensor.

Dielectric flat 495 can have a plurality of metal contacts 470, 471 extending therefrom. Gap 465 can be interposed between metal contacts 470, 471 so that they are not in electrical contact. One metal contact 470 can be electrically coupled to electric motor 340. The other metal contact 471 can be electrically coupled to electrical ground (ground). Together, metal contacts 470, 471 and conductive endpiece 430 can form an electrical switch by which to operate shredder motor 340. Contacts 470, 471 further may be bent and pressed to improve contact, when made, with conductive endpiece 430. Plural pairs of metal contacts may be used and, if so, they can be symmetrically spaced apart.

During shredding, blade portion moves linearly, which is translated to rotational movement by cylindrical body 420. When endpiece 430 rotates, the annular metal sheet 480 can be urged toward metal sensors 470, 471, and ultimately can touch metal contacts 470, 471, when bin 360 is full. Curve 450 can be shaped to permit shreddant 350 to easily move aside T-blade 400, without being immobilized, by the growing mass of shreddant 350. When pressed upon by shreddant 350 accumulating in bin 360, curved T-blade 400 pivots in a plane generally perpendicular to the longitudinal axis of the cylindrical body 420.

Figure 23B:
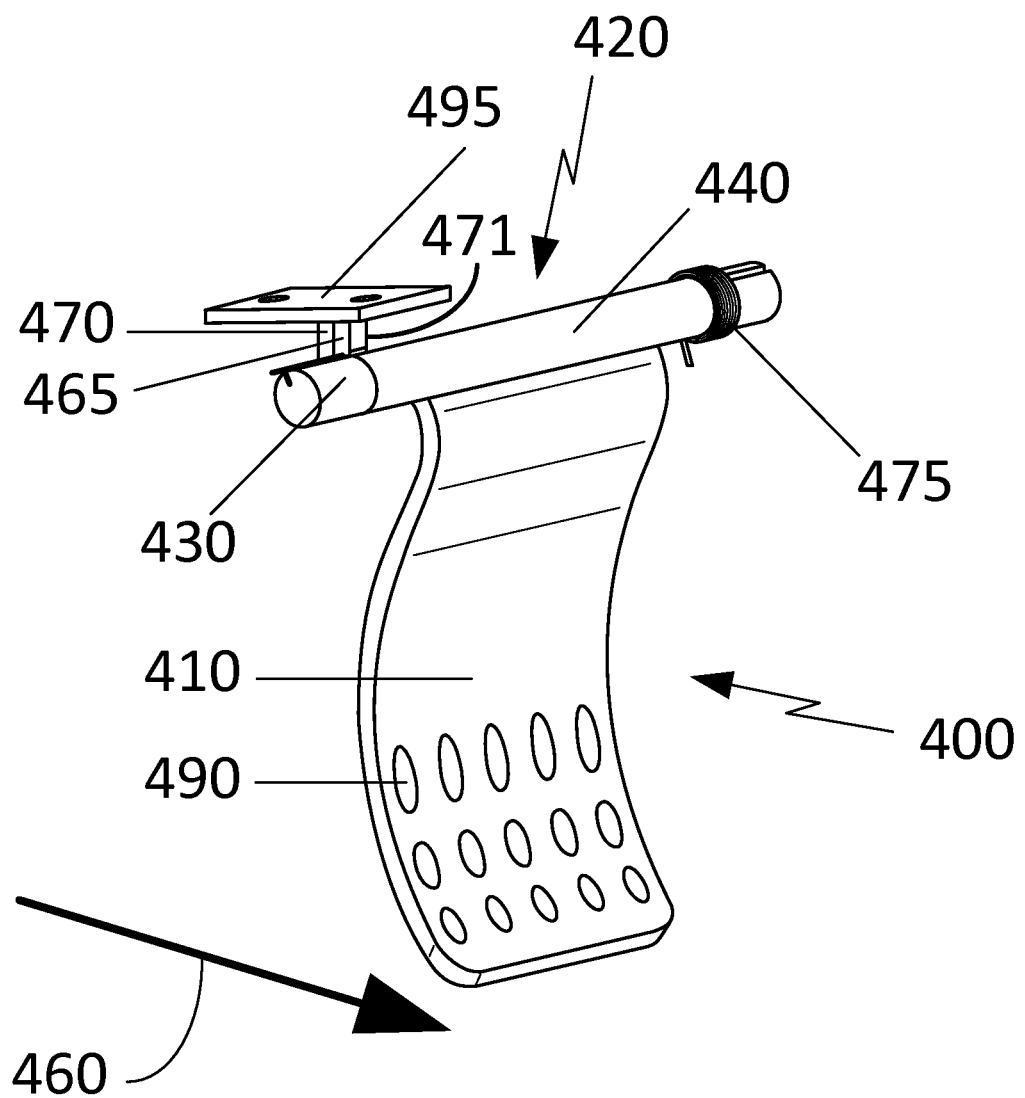
FIG. 23B is a perspective view of the T-blade sensor of FIG. 2A in the shredder disabled position, in accordance with the teachings of the present invention.

Pressure from shreddant 350 tends to urge T-blade 400 generally to the right along line 460. By filling bin 360 with shreddant 350, T-blade 400 can be moved from the "ON" (or "RESET") position, when empty, to the "OFF" (or "FULL") position, when full. As illustrated in FIG. 23B, conductive endpiece 430 can be separated from contacts 470, 471. In this case, a corresponding switch (not shown) is open, and a circuit (not shown) coupled to electrical motor 340 can be energized. During shredding, as curved T-blade 400 is forced towards the "OFF" position, conductive endpiece 430 is urged towards contacts 470, 471. When the bin is full at a predetermined level, contacts 470, 471 touch conductive endpiece 430, and the corresponding switch is closed. The completed circuit causes power to be removed from electrical motor 430 by the circuit, ceasing shredding. Dielectric flat 495 may be physically coupled to a PCB (not shown), bearing the control circuit (not shown) for motor 340.

In embodiments, curved T-blade 400 can have ring-type torsional spring 475 on non-conductive portion 440 of cylindrical body 420, which is positioned to bias T-blade 400 to the "ON" (or "RESET") position when the bin 360 is empty. In this state, conductive endpiece 430 is not touching contacts 470, 471. By filling bin 360 with shreddant 350, the spring 475 bias on T-blade 400 can be overcome by the force of the accumulating shreddant 350 until T-blade 400 is moved to the "OFF"/"FULL" position when shredder bin 360 can be considered to be full. In the "OFF"/"FULL" position, conductive endpiece 430 can touch contacts 470, 471. Spring 475 may be a tension spring or compression spring, although other mechanical biasing devices may be used.

In other embodiments, instead of a spring-loaded reset, a gravity reset also can be used. For example, from the "ON"/"RESET" position, accumulating shreddant 350 gradually fills bin 360, pressing upon T-blade 400 and forcing it against gravity to the "OFF"/"FULL" position, whereupon shredding is caused to cease. When bin 360 is emptied, gravity can bring T-blade 400 to the "ON"/"RE-SET" position, removing contact between conductive endpiece 430 and contacts 470, 471 and allowing the shredder operation.

In an alternative embodiment, conductive endpiece 430 may be disposed to make electrical contact with metal contacts 470, 471 while the bin is empty, and break electrical contact with metal sensor 470, 471, when the bin becomes full. In this configuration, a full bin 360 can cause an open circuit by, which power can be removed from electrical motor 340. In other words, the functionality of the contacts can be reversed in alternative embodiments.

Figure 24:
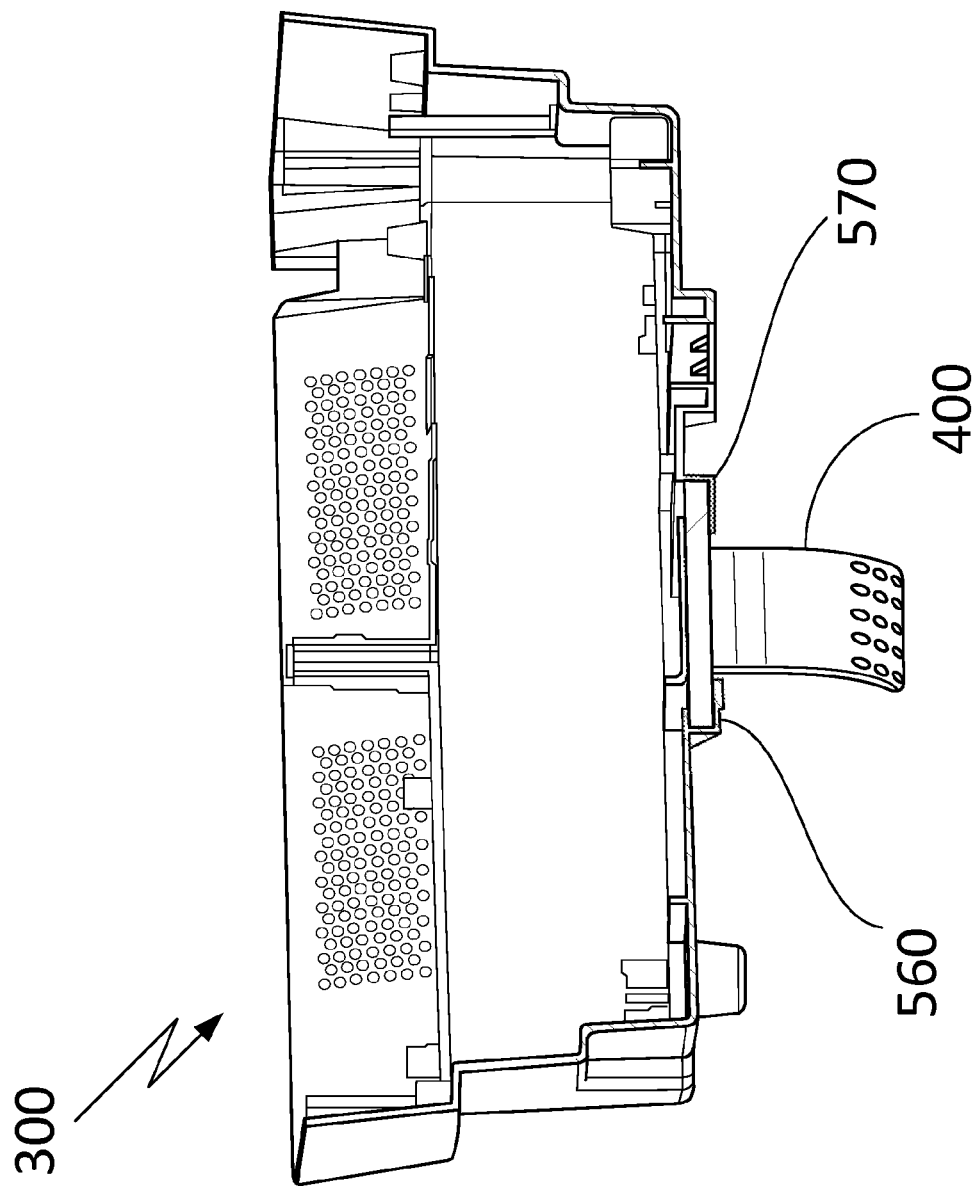
FIG. 24 is a cut-away front view of a shredder having a T-blade pendent therefrom, in accordance with the teachings of the present invention.
Figure 25:
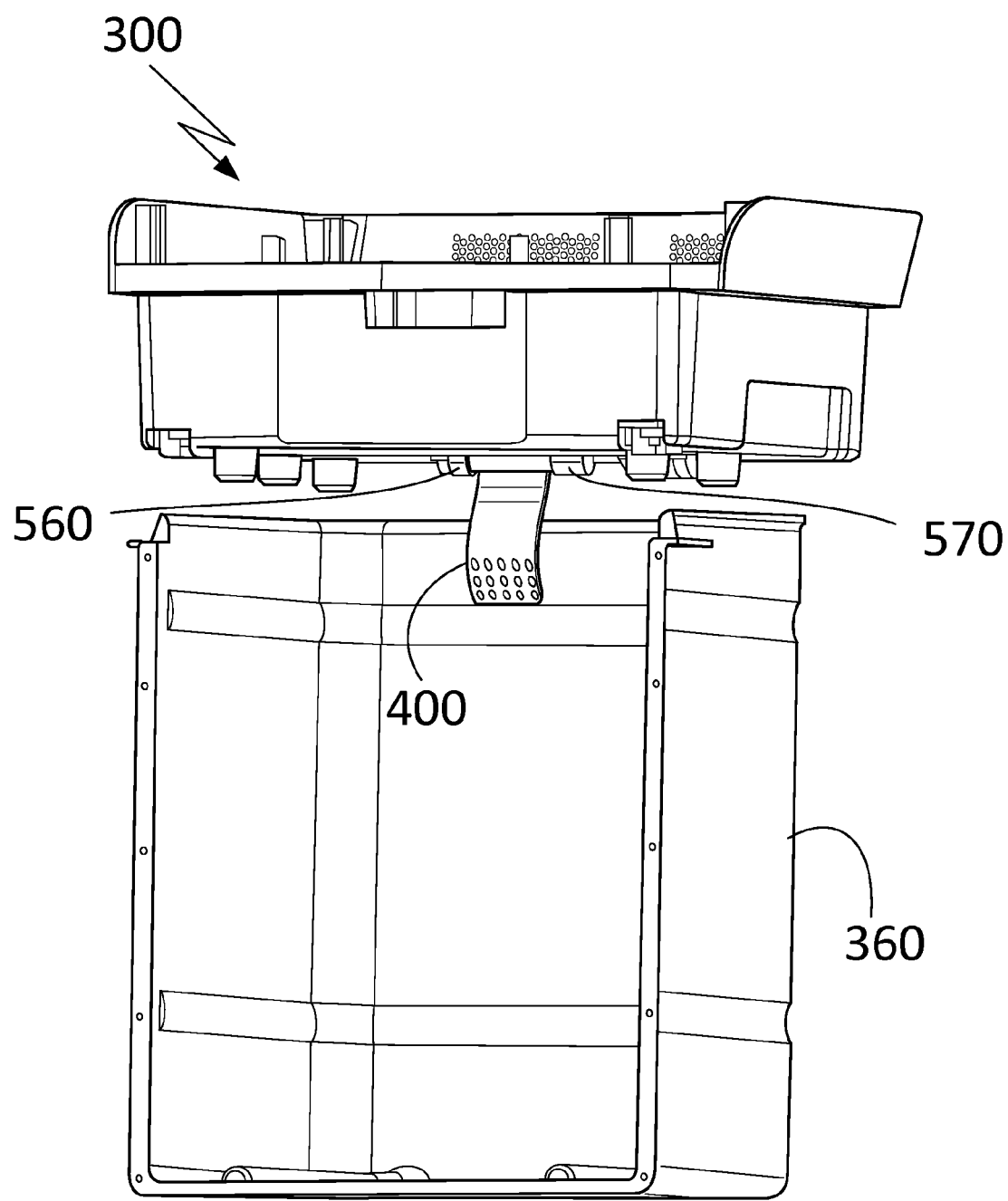
FIG. 25 is a cut-away perspective view of the shredder of FIG. 24, with a bin coupled to the shredder, in accordance with the teachings of the present invention.

In embodiments, the pendent blade portion of T-blade 400 can be perforated, and may have a sufficient number, size, and distribution of holes, generally at 490, to make the T-blade both strong and lightweight. Turning to FIG. 24, T-blade 400 may be held in place in shredder 300 by means of a first holder 560 and a second holder 570. Turning to FIG. 25, shredder 300 is shown separated from cut-away bin 360, thereby exposing the location of T-blade 400. T-blade 400 can be held in place by holders 560, 570, as shown in FIG. 24.

Figure 26:
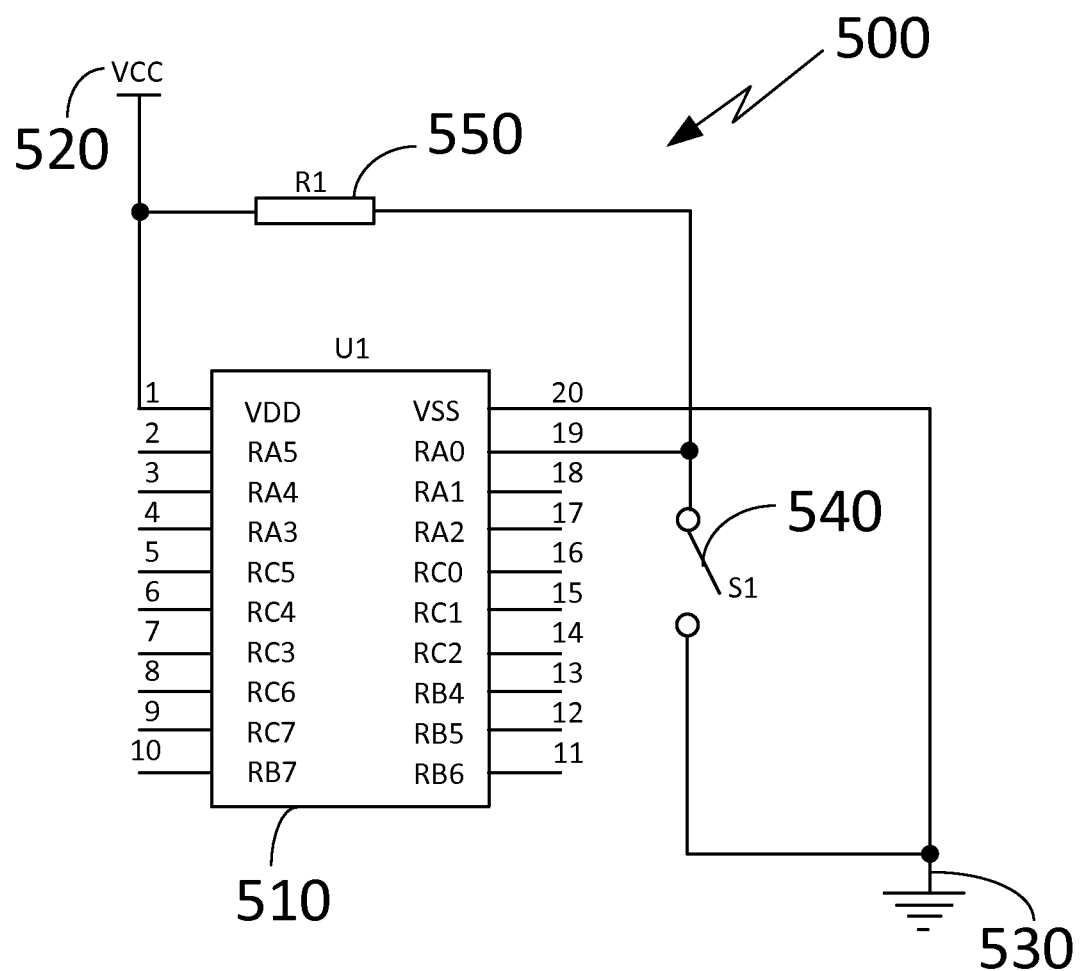
FIG. 26 is a microcontroller implementation of control circuit for a shredder electric motor, in accordance with the teachings of the present invention.

FIG. 26 illustrates one embodiment of control circuit 600 for electrical motor 340, using PIC16F690 8-bit microcontroller 510 produced by Microchip, Inc., Chandler, Ariz. USA. RA0, on pin 19, is a general purpose I/O port, which produces an interrupt to the microcontroller 510 upon a change of the pin voltage state. VCC power 520 can be electrically coupled to microcontroller 510 VDD pin, and microcontroller 510 VSS pin 20 can be electrically coupled to ground 530. Switch S1 540 is electrically coupled between RA0 pin 19 and ground 530. Switch S1 540 may be composed of metal contacts 470, 471 and conductive endpiece 430.

When shredder 300 is in the "ON" state, switch S1 540 is "OPEN" and pin 19 is provided an electrically pulled-up VCC-level signal through biasing resistor 550. Switch S1 540 also is a switch generally representative of the contact state of conductive endpiece 430 with at least one metal contact 470. In embodiments, with bin 360 in the not-full state, S1 remains "OPEN" and shredder functions are allowed to proceed. As bin 360 fills with shreddant, S1 remains "OPEN." Upon contact of conductive endpiece 430 with at least one metal contact 470, switch S1 540 is "CLOSED," pulling down RA0/pin 19 to ground 530 and changing its electrical state, thereby forcing an interrupt upon microcontroller 510. An interrupt routine for RA0/pin 19 pin can manipulate the states of other pins on microcontroller 510, turning OFF electrical motor 340, and ending shredding.

Embodiment 7

Figure 27:
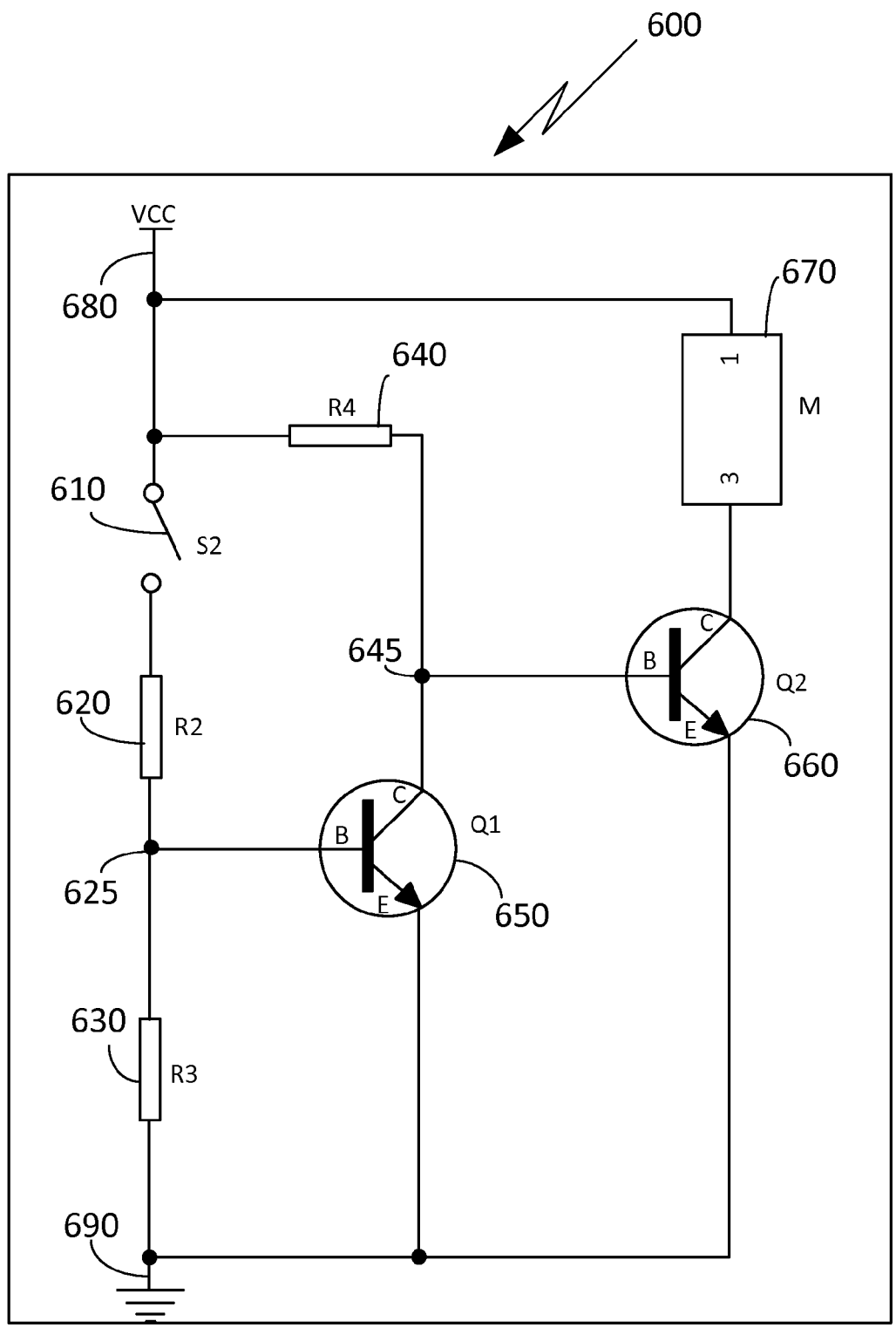
FIG. 27 is a two-transistor implementation of a control circuit for a shredder electric motor, in accordance with the teachings of the present invention.

FIG. 27 depicts another embodiment of control circuit 600, which can include switch S2 610, voltage divider resistors R2 620, R3 630, biasing resistor R4 640, transistor Q1 650, transistor Q2 660, and motor relay 670. Providing power is VCC 680. Ground is 690. Switch S2 610 may be composed of metal contacts 470, 471 and conductive endpiece 430. In FIG. 6, VCC 680 is electrically connected with switch S2 610, biasing resistor R4 640, and motor relay M 670. Switch S2 610 is connected to first voltage divider resistor R2 620, which is connected through node 1 625 to second voltage divider resistor R3 630. Node 1 625 can be connected to the Base of transistor Q1 650. Biasing resistor R4 640 is connected to node 2 645 and to the Collector of transistor Q1 650. Node 2 645 is connected to the Base of transistor Q2 660. Motor relay 670 is connected to the Collector of transistor Q2 660. Second divider resistor R3 630 and the Emitters of transistors Q1 650 and Q2 660 are connected to ground 690.

As above, when bin 360 is not full, S2 remains "OPEN," causing the Base of transistor Q1 650 to be connected to ground 690 through second divider resistor R3 630, turning "OFF" transistor Q1 650. VCC 680 biases resistor R4 640 such that the Base of second transistor Q2 660 is energized, turning "ON" transistor Q2 660. This causes current to flow through motor relay M 670, causing shredder motor 340 to be "ON" (or energized). When bin 360 fills to a predetermined level, conductive endpiece 430 contacts at least one metal contact 470, causing switch S2 610 to be closed. With switch S2 610 closed, the voltage of the BASE of transistor Q1 650 is raised through R2, causing transistor Q1 650 to turn "ON." Turning "ON" transistor Q1 650 causes node 2 645, and the Base of transistor Q2 660, to be pulled to ground 690, thereby turning "OFF" transistor Q2 660. Turning "OFF" transistor Q2 660, shuts off motor relay M 670 which, in turn, shuts "OFF" shredder motor 340

The example embodiments of the present invention disclosed herein are intended to be illustrative only, and are not intended to limit the scope of the invention. It should be understood by those skilled in the art that various modifications and adaptations of the prevent invention as well as alternative embodiments of the prevent invention may be contemplated or foreseeable. It is to be understood that the present invention is not limited to the sole embodiments described above, but encompasses any and all embodiments within the scope of the following claims.

The invention claimed is:

1. A shredder, comprising:
    a shredder element having blades driven by an electric motor, a shredder input to the blades and a shredder output from the blades, wherein the shredder input receives shreddables and the shredder output produces discharges shreddant when the electric motor is operating;
    a bin mechanically coupled to the shredder element, wherein the bin receives the shreddant;
    a curved T-blade sensor mechanically coupled to and set apart from the shredder element, and electrically coupled to the electric motor,
    wherein the T-blade sensor rotates to a predefined position to select contact an electrical contact such that the electric motor is non-operating when shreddant reaches a predetermined level in the bin,
    wherein the T-blade sensor comprises a pendent blade perpendicularly affixed to a cylindrical body, the cylindrical body having an electrical sensor thereon configured to electrically connect with electrical contacts on the shredder element.

2. The shredder of claim 1, wherein the curved pendent blade is perforated with a plurality of holes.

3. The shredder of claim 1, wherein the electrical sensor and electrical contacts form a switch, coupled to the electrical motor.

4. The shredder of claim 3, further comprising:
    a microcontroller coupled to the switch, wherein the microcontroller is configured to stop the electric motor when the T-blade sensor rotates to the predefined position and the switch is closed.

5. The shredder of claim 3, further comprising:
    a microcontroller coupled to the switch, wherein the microcontroller is configured to allow the electric motor to turn on when the T-blade sensor rotates away from the predefined position and the switch is open.

6. The shredder of claim 3, further comprising:
    the switch coupled between VCC and a first voltage divider resistor, the first voltage divider resistor coupled to a first node, the first node coupled to a second voltage divider resistor, the first node being coupled to a base of a first transistor, the second voltage divider resistor being coupled to ground;
    a biasing resistor coupled between VCC and a collector of a first transistor through a second node, the second node being coupled to a base of a second transistor, an emitter of the first transistor being coupled to ground; and
    a motor relay coupled between VCC and a collector of the second transistor, an emitter of the second transistor being coupled to ground,
    wherein, with the switch open, the motor relay is disposed to allow the electric motor to operate, and
    wherein, with the switch closed, the motor relay is disposed to disable the electric motor from operating.

* * * * *